(12) United States Patent
Menashi

(10) Patent No.: US 7,541,308 B2
(45) Date of Patent: *Jun. 2, 2009

(54) FUEL CELLS AND OTHER PRODUCTS CONTAINING MODIFIED CARBON PRODUCTS

(75) Inventor: Jameel Menashi, Lexington, MA (US)

(73) Assignee: Cabot Corporation, Boston, MA (US)

(*) Notice: Subject to any disclaimer, the term of this patent is extended or adjusted under 35 U.S.C. 154(b) by 424 days.

This patent is subject to a terminal disclaimer.

(21) Appl. No.: 10/112,689

(22) Filed: Mar. 29, 2002

(65) Prior Publication Data

US 2003/0017379 A1    Jan. 23, 2003

Related U.S. Application Data

(63) Continuation-in-part of application No. 09/833,202, filed on Apr. 11, 2001.

(60) Provisional application No. 60/363,307, filed on Mar. 8, 2002, provisional application No. 60/307,890, filed on Jul. 26, 2001, provisional application No. 60/282,944, filed on Apr. 11, 2001.

(51) Int. Cl.
C09C 1/48 (2006.01)

(52) U.S. Cl. ............... 502/185; 502/182; 502/416; 502/417; 423/449.2

(58) Field of Classification Search .......... 423/449.2; 502/182, 185, 416, 417
See application file for complete search history.

(56) References Cited

U.S. PATENT DOCUMENTS

| | | | |
|---|---|---|---|
| 3,077,508 A | 2/1963 | Oswin | 136/121 |
| 3,600,166 A | 8/1971 | Sieg et al. | |
| 3,963,510 A * | 6/1976 | Osswald et al. | 106/402 |
| 4,136,059 A * | 1/1979 | Jalan et al. | 502/101 |
| 4,405,544 A | 9/1983 | Solomon | 264/127 |
| 4,835,074 A | 5/1989 | Bolster et al. | 429/43 |
| 4,876,115 A | 10/1989 | Raistrick | 427/115 |
| 4,877,694 A | 10/1989 | Solomon et al. | 429/27 |
| 4,892,637 A | 1/1990 | Sauer et al. | 204/291 |
| 5,084,144 A | 1/1992 | Reddy et al. | 205/104 |
| 5,116,592 A | 5/1992 | Weinberg | 423/415 R |
| 5,232,561 A | 8/1993 | Furuya | 204/73 R |
| 5,234,777 A | 8/1993 | Wilson | 429/33 |
| 5,302,274 A | 4/1994 | Tomantschger et al. | 204/412 |
| 5,316,871 A | 5/1994 | Swathirajan et al. | 429/33 |
| 5,441,823 A | 8/1995 | Naimer et al. | 429/42 |
| 5,501,915 A | 3/1996 | Hards et al. | 429/42 |
| 5,521,020 A | 5/1996 | Dhar | 429/142 |
| 5,531,883 A | 7/1996 | Cameron et al. | 205/626 |
| 5,554,739 A | 9/1996 | Belmont | 534/885 |
| 5,561,000 A | 10/1996 | Dirven et al. | 429/42 |
| 5,571,311 A | 11/1996 | Belmont et al. | 106/20 R |
| 5,630,868 A | 5/1997 | Belmont et al. | 106/31.75 |
| 5,672,198 A | 9/1997 | Belmont | 106/20 R |
| 5,689,016 A | 11/1997 | Weider et al. | 568/862 |
| 5,707,432 A | 1/1998 | Adams et al. | 106/31.6 |
| 5,713,988 A | 2/1998 | Belmont et al. | 106/31.6 |
| 5,733,430 A | 3/1998 | Ashida et al. | 205/337 |
| 5,783,325 A | 7/1998 | Cabasso et al. | 429/42 |
| 5,803,959 A | 9/1998 | Johnson et al. | 106/31.75 |
| 5,830,930 A | 11/1998 | Mahmud et al. | 523/215 |
| 5,837,045 A | 11/1998 | Johnson et al. | 106/31.85 |
| 5,846,670 A | 12/1998 | Watanabe et al. | 429/42 |
| 5,851,280 A | 12/1998 | Belmont et al. | 106/472 |
| 5,869,550 A | 2/1999 | Mahmud et al. | 523/215 |
| 5,877,238 A | 3/1999 | Mahmud et al. | 523/215 |
| 5,904,762 A | 5/1999 | Mahmud et al. | 106/475 |
| 6,017,980 A | 1/2000 | Wang et al. | 523/215 |
| 6,042,643 A | 3/2000 | Belmont et al. | 106/472 |
| 6,054,230 A | 4/2000 | Kato | |
| 6,057,387 A | 5/2000 | Mahmud et al. | 523/215 |
| 6,280,871 B1 | 8/2001 | Tosco et al. | 429/41 |
| 6,399,202 B1 * | 6/2002 | Yu et al. | 428/403 |
| 6,495,290 B1 | 12/2002 | Hinokuma et al. | |
| 6,660,680 B1 * | 12/2003 | Hampden-Smith et al. | 502/180 |
| 6,746,793 B1 | 6/2004 | Gyoten et al. | 429/40 |

FOREIGN PATENT DOCUMENTS

| | | | |
|---|---|---|---|
| DE | 2355758 | * 11/1973 | 423/449.2 |
| EP | 0 327 018 A2 | 8/1989 | |
| EP | 0 435 835 B1 | 7/1991 | |
| JP | 8-329962 | 12/1996 | |
| WO | WO 96/18688 | 6/1996 | |
| WO | WO 96/37547 | 11/1996 | |
| WO | WO 97/47697 | 12/1997 | |
| WO | WO 97/47699 | 12/1997 | |
| WO | WO 01/06519 A1 | 1/2001 | |

OTHER PUBLICATIONS

Ehrburger et al., 'Carbon as a Support for Catalysts' in Journal of Catalysis vol. 43 pp. 61-67 (1976).*

Arico et al., The Role of Pt-Loading, Thermal, Treatment and Exposure to Air on the Acid-Base Behavior of a Pt/Carbon Black Catalyst in Carbon vol. 28 #5 pp. 559-609, 1990.*

E. Bradley Easton et al., Chemical Modification of Proton Exchange Membrane Fuel Cell Catalysts with a Sulfonated Silane, Electrochemical and Solid-State Letters, 4 (5) A59-A61 (2001).

U.S. Appl. No. 09/833,202, abandonded.

(Continued)

*Primary Examiner*—Stuart Hendrickson
(74) *Attorney, Agent, or Firm*—Kilyk & Bowersox, P.L.L.C.

(57) ABSTRACT

Fuel cells are described and contain a gas diffusion electrode, a gas diffusion counter-electrode, an electrolyte membrane located between the electrode and counter-electrode. The electrode or counter-electrode or both contain at least one modified carbon product. The electrolyte membrane can also or alternatively contain modified carbon products as well. The modified carbon product is a carbon product having attached at least one organic group. Preferably the organic group is a proton conducting group and/or an electron conducting group. The present invention preferably permits the elimination of fluoropolymer binder in the active or catalyst layer and further preferably leads to a thinner active layer and/or a thinner electrolyte membrane. Other uses and advantages are also described.

18 Claims, 9 Drawing Sheets

OTHER PUBLICATIONS

Juengel et al., "Effect of carbon black loading, surface area, and polymer type on the permeability of innerliner compounds," *International Tire Exhibition and Conference*, Paper #1A (1994).

Mizuhata et al., "Preparation of gas diffusion electrode with highly-active catalyst for PEFC's," *Electrochemical Society Proceedings*, vol. 95-23, pp. 24-33 (no date).

Amine et al., "New process for loading highly active platinum on carbon black surface for application in polymer electrolyte fuel cell," *Ann. Chim. Sci. Mat.*, vol. 23, pp. 331-335 (1998).

Jay Janzen, "On the critical conductive filler loading in antistatic composites," *Journal of Applied Physics*, vol. 46, No. 2, pp. 966-969 (1975).

Mammone et al., "Properties of platinum catalysts supported on modified carbon blacks," U.S. Army Research Lab, pp. 624-628 (no date).

Watanabe, et al., "The influence of platinum crystallite size on the electroreduction of oxygen," *J. Electroanal. Chem.*, vol. 261, pp. 375-387 (1989).

Ren et al., "Water and methanol uptakes in nafion membranes and membrane effects on direct methanol cell performance," *Journal of The Electrochemical Society*, vol. 147 (1) pp. 92-98 (2000).

Ren et al., "Methanol transport through nafion membranes Electro-osmotic drag effects on potential step measurements," *Journal of The Electrochemical Society*, vol. 147 (2), 466-474 (2000).

Ren et al., "Recent advances in direct methanol fuel cells at Los Alamos National Laboratory," *Journal of Power Sources*, vol. 86, pp. 111-116 (2000).

Wilson et al. "High performance catalyzed membranes of ultra-low Pt loadings for polymer electrolyte fuel cells," *J. Electrochem. Soc.*, vol. 139, No. 2, pp. L28-L30 (1992).

Hara et al., "An advanced gas diffusion electrode for high performance phosphoric acid fuel cells," *Journal of Electroanalytical Chemistry*, vol. 413, pp. 81-88 (1996).

Boyer et al., "Measurements of proton conductivity in the active layer of PEM fuel cell gas diffusion electrodes," *Electrochimica Acta*. vol. 43, No. 24, pp. 3703-3709 (1998).

Antolini et al., "Studies of gas diffusion electrodes for polymer electrolyte fuel cells: effect of polytetrafluoroethylene content on the microstructure of the diffusion layer," *Proc. Eur. Conf. Adv. Mater. Processes Appl.* $5^{th}$, vol. 3, pp. 503.3-503 (1997).

Ticianelli, et al., "Localization of platinum in low catalyst loading electrodes to attain high power densities in SPE fuel cells," *J. Electroanal. Chem.*, vol. 251, pp. 275-295 (1988).

Antolini et al., "Influence of Nafion loading in the catalyst layer of gas-diffusion electrodes for PEFC," *Journal of Power Sources*, vol. 77, pp. 136-142 (1999).

Lee et al., "Effects of Nafion impregnation on performances of PEMFC electrodes," *Electrochimica. Acta.*, vol. 43, No. 24, pp. 3693-3701 (1998).

Taylor et al., "Preparation of high-platinum-utilization gas diffusion electrodes for proton-exchange-membrane fuel cells," *J. Electrochem. Soc.*, vol. 139, No. 5, pp. L45-L46 (1992).

Gottesfeld et al., "Polymer Electrolyte Fuel Cells," *Advances in Electrochemical Science and Engineering*, vol. 5, pp. 1-413 (1997).

Pletcher, "Electrogenerated hydrogen peroxide—from history to new opportunities," www.electrosynthesis.com/news/w7content.html, vol. 4, No. 1 (1999).

Partial International Search Report for PCT/US2002/11196 dated Jan. 18, 2005.

English translation of Office Action received in corresponding Japanese Patent Application No. 2002-581607 dated Oct. 28, 2008 (7 pages).

* cited by examiner

FUEL CELLS AND OTHER PRODUCTS CONTAINING MODIFIED CARBON PRODUCTS

This application claims the benefit under 35 U.S.C. §119 (e) of prior U.S. Provisional Patent Application No. 60/282,944 filed Apr. 11, 2001, U.S. Provisional Patent Application No. 60/307,890 filed Jul. 26, 2001, and U.S. Provisional Patent Application No. 60/363,307 filed Mar. 8, 2002, and is also a continuation-in-part of U.S. patent application Ser. No. 09/833,202 filed Apr. 11, 2001, which are all incorporated in their entirety by reference herein.

BACKGROUND OF THE INVENTION

The present invention relates to fuel cells and gas diffusion electrodes which can be used in a variety of applications. The present invention further relates to methods of preparing the fuel cells and other products. The present invention further relates to materials particularly suitable in the manufacture of fuel cells and gas diffusion electrodes and other electrodes.

A gas diffusion electrode (GDE) typically contains a hydrophobic polymer in contact with a high surface area electrically conductive or semiconductive material which supports the finely dispersed catalyst particles. The hydrophobic polymer is usually PTFE (polytetrafluoroethylene), the support material is usually carbon, and the catalyst is usually a metal, such as platinum. The polymer-catalyst-support layer is held by a carbon cloth or a carbon paper. The side of the electrode which contains the catalyst layer is referred to as the "catalytic" side and the opposite side is referred to as the "gas" or gas-permeable side.

A GDE is used in electrochemical processes for bringing gaseous reactants to the reaction sites in contact with an electrolyte. Such an electrochemical process is typically used in a fuel cell for generating electricity. A GDE can be used in an alkaline, phosphoric acid, and proton exchange membrane (PEM) electrolyte fuel cell, also referred to as a solid polymer electrolyte fuel cell (SPFC). The former two electrolytes—alkaline and phosphoric acid—being liquid, can easily bathe the catalyst (or reaction sites) and make good contact with the catalyst for optimum fuel cell performance. A three dimensional reaction zone on an electrode in contact with the electrolyte is not created easily since the PEM electrolyte is a solid. The result is that the efficiency of utilization of the catalyst in a fuel cell reaction involving a PEM electrolyte is low, about 10-20%. Attempts have been made to address this problem by (a) impregnating a small amount of electrolyte solution into the electrode structure, drying the electrolyte and finally pressing the impregnated electrodes against the PEM electrolyte, (b) using a relatively greater proportion of platinum in the platinum/carbon mixture that constitutes the porous electrode, (c) sputtering a thin layer of platinum on top of the porous electrode and, in some limited cases, (d) depositing a layer of platinum on top of the already catalyzed electrode.

Accordingly, fuel cells and gas diffusion electrodes overcoming one or more of the above-described disadvantages are desirable. In addition, fuel cells and gas diffusion electrodes which are less expensive to manufacture and/or operate more efficiently would be preferred in the industry.

SUMMARY OF THE PRESENT INVENTION

A feature of the present invention is to provide fuel cells having beneficial properties.

Another feature of the present invention is to provide gas diffusion electrodes which can be used in a variety of devices and applications which have improved properties.

A further feature of the present invention is to provide fuel cells that are preferably less expensive to manufacture and/or are more efficient to operate.

A further feature of the present invention is to provide fuel cells having reduced cross over.

An additional feature of the present invention is to provide inner membranes used in fuel cells and other devices.

Another feature of the present invention is to provide an active layer in a gas diffusion electrode which is thinner and/or has improved catalyst accessibility.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a fuel cell containing a gas diffusion electrode, a gas diffusion counter-electrode, an electrolyte membrane located between the electrode and counter-electrode, wherein the electrode or the counter-electrode or both contain at least one modified carbon product. The electrolyte membrane can contain modified carbon products as well which can be the same or different from any modified carbon product contained in one or both electrodes. The modified carbon product is a carbon product having attached at least one organic group.

The present invention further relates to an electrolyte membrane containing at least one modified carbon product, wherein the modified carbon product contains at least one carbon product having attached at least one organic group.

The present invention also relates to a gas diffusion electrode containing a blocking layer and an active layer, wherein the active layer contains at least one modified carbon product. The active layer is preferably less than about 10 microns thick.

The present invention further relates to a catalytic material containing a modified carbon product having attached at least one catalytic material.

The present invention also relates to method of preparing a catalytic material which involves depositing catalyst on a modified carbon product.

The present invention further relates to methods of making thinner electrolyte membranes with the use of modified carbon products and further relates to methods of reducing cross over with the use of the modified carbon products.

Furthermore, the present invention relates to a method of improving catalyst accessibility by using a modified carbon product in the active layer and more preferably using a catalytic material which contains a modified carbon product having attached at least one organic group and catalytic material.

It is to be understood that both the foregoing general description and the following detailed description are exemplary and explanatory only and are intended to provide a further explanation of the present invention, as claimed.

The accompanying drawings, which are incorporated in and constitute a part of this application illustrate several embodiments of the present invention and together with the description, serve to explain the principles of the present invention.

DETAILED DESCRIPTION OF THE PRESENT INVENTION

Figure 1:
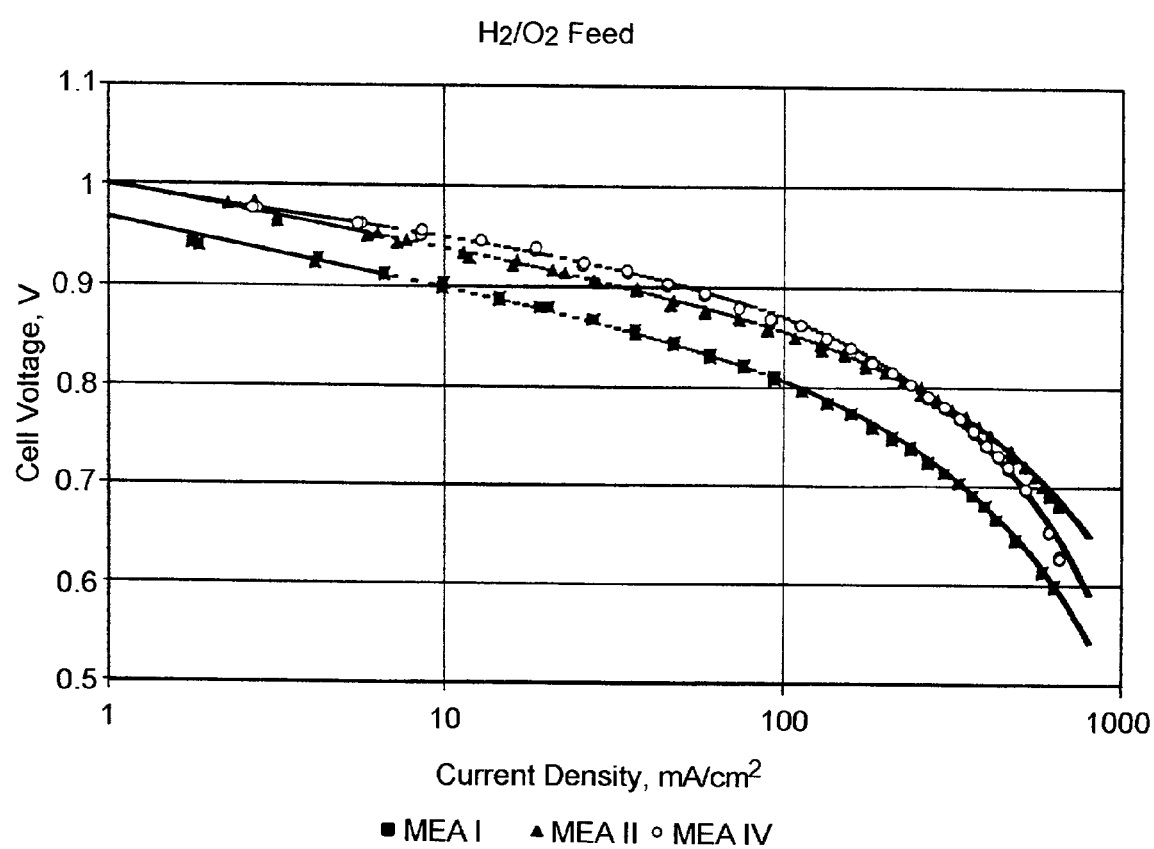
FIG. 1 is a graph showing $H_2/O_2$ feed comparisons for several embodiments of the present invention.

The present invention relates to the use of one or more types of modified carbon products in various components of a fuel cell. In the present invention, modified carbon products can be used in the gas diffusion electrode, the gas diffusion counter-electrode, and/or the electrolyte membrane located between the electrode and counter-electrode. One or all of the components can contain the modified carbon product and the modified carbon product can be different for each component of the fuel cell.

In an embodiment of the present invention, the catalyst layer or active layer of a gas diffusion electrode can primarily contain one or more modified carbon products with or without at least one binder. Preferably, the amount of binder which can be a Nafion type fluoropolymer can be substantially reduced and more preferably eliminated entirely by using a modified carbon product. Preferably, the modified carbon product has attached at least one organic group wherein the modified carbon product serves as an electron conductor and/ or also as a proton conductor. Thus, a modified carbon product used in the catalyst layer can serve the function of the fluoro-binder, such as Nafion. With the use of modified carbon products in the catalyst layer, improved catalyst activity is preferably accomplished which can be achieved for a number of reasons such as enhancement in the catalyst effectiveness and enhancement in mass transport. Since the catalyst particles that are present in the catalyst layer should be as close in proximity to the proton conducting groups for excellent catalyst utilization, the use of modified carbon products which have organic groups acting as electron conductors and proton conductors permits the catalyst particles to be in close proximity to these proton conducting groups which is not possible when a binder such as Nafion is used as the proton conductor.

The catalyst layer using the modified carbon products can be formed in a number of ways. The modified carbon products can be used in place of conventional carbon black that is present in catalyst layers and thus can be formed in the same manner. Alternatively or in combination, the carbon support used as the catalyst layer can be formed of modified carbon products and then the deposition of the catalyst particles (e.g., metal catalyst, such as Pt) such as by noble metal deposition can be directly on the carbon support. This type of method ensures the close proximity of the catalyst particles to the modified carbon products.

In more detail, when a binder such as Nafion binder is used in the active layer, there is a trade-off between the benefits of improved proton conduction and reduced mass transfer of gas to the catalyst. The binder increases mass transfer resistance by being deposited on the metal catalyst and in the pores of the active layer. The amount of binder employed can be reduced or, more preferably, completely eliminated by using a catalyzed support having modified carbon products present. As an example, if the modified carbon product is a carbon black having attached —$C_6H_4SO_3H$ groups, the equivalent weight (EW) of the —$SO_3H$ groups in a perfluorosulfonic acid, such as Nafion, is about 1100 whereas the molecular weight of the attached —$C_6H_4SO_3H$ group is 157. Accordingly, a treatment weight that is approximately ⅐ that of the weight of the Nafion binder can be used to provide the same number of proton conducting groups. Thus, the present invention permits less material present in the catalyst layer and by reducing the amount of material present in the catalyst layer, the mass transfer should be greatly improved which permits excellent catalyst utilization.

Furthermore, with respect to the catalyst layer, preferably the catalyst layer is very thin such as 10 microns or less thick. If the catalyst layer cannot be made thin, porosity in the active layer is generally needed to aid transport of the reactive gas to the catalyst. In fact, typically humidified gases are used in fuel cells to keep the electrolyte membrane and the fluoronated binder in the catalyst layer hydrated. Typically, hydrophobic pores are introduced into the active layer to avoid pore flooding by the use of fluoronated particulates such a PTFE. However, while the use of PTFE particulates, for instance, may solve one problem they also create another problem by blocking access to many of the catalyst sites. Accordingly, with the present invention, catalyst accessibility can be substantially increased by using either a hydrophobicly treated carbon product or by using a carbon product which has attached hydrophobic groups as well as hydrophilic groups. By using the modified carbon products in the catalyst layer, the thickness of the catalyst layer can be greatly reduced since the need for binder is reduced or completely eliminated and fluoronated materials can be avoided due to the solutions offered by the modified carbon products and the particular selection of organic groups attached onto the carbon products. Since surface functionalization can be used to make the carbon products hydrophobic at the primary particle level at modest treatment levels, a smaller volume of a hydrophobicly treated carbon product is used to introduce the same level of hydrophobic porosity compared to a conventional carbon black made hydrophobic with PTFE. Accordingly, the present invention permits a thinner active layer and hence improved mass transport of the reactive gases to the catalytic sites. With the present invention, preferably the catalyst layer has a film thickness of less than 10 microns and more preferably less than about 5 microns and even more preferably a thickness of from about 2 microns to about 5 microns.

In the present invention, the carbon products used to form the modified carbon product can be any type of carbon product and preferably those associated with gas diffusion electrodes. Preferably, the carbon products and more preferably carbon black are relatively micropore-free. Although acetylene blacks and carbon blacks with comparably small surface areas are micropore-free, their low surface areas make them less suitable for use with conventional methods of supported catalyst formation due to larger platinum crystallites. Accordingly, preferred carbon products, especially carbon blacks, are those having large surface areas wherein the ratio of micropore-free surface area to total surface area is as large as possible.

Other carbon products that can be used in the present invention include a multi-phase aggregate containing a carbon phase and the silicon-containing species phase, which can also be considered a silicon-treated carbon black aggregate. The multi-phase aggregate can also be an aggregate containing a carbon phase and a metal-containing species phase, which can be considered to be a metal-treated carbon black aggregate as long as one realizes that in either case, the silicon-containing species and/or metal-containing species are a phase of the aggregate just like the carbon phase. The multi-phase aggregates do not represent a mixture of discrete carbon black aggregates and discrete silica or metal aggregates and is not a silica coated carbon black. Rather, the multi-phase aggregates used in the present invention include at least one silicon-containing or metal-containing region concentrated at or near the surface of the aggregate (but part of the aggregate) and/or within the aggregate.

The aggregate, thus contains at least two phases, one of which is carbon and the other of which is a silicon-containing species, a metal-containing species, or both. The silicon-containing species that can be a part of the aggregate is not attached to a carbon black aggregate like a silica coupling agent, but actually is part of the same aggregate as the carbon phase. For instance, when the multi-phase aggregate having a carbon phase and a silicon-containing species phase is examined under STEM-EDX, the silicon signal corresponding to the silicon-containing species is found to be present in individual carbon black aggregates. By comparison, for example, in a physical mixture of silica and carbon black, STEM-EDX examination reveals distinctly separate silica and carbon black aggregates.

The metal-treated carbon blacks are aggregates containing at least a carbon phase and a metal-containing species phase. The metal-containing species include compounds containing aluminum, zinc, magnesium, calcium, titanium, vanadium, cobalt, nickel, zirconium, tin, antimony, chromium, neodymium, lead, tellurium, barium, cesium, iron, and molybdenum. Preferably, the metal-containing species phase is an aluminum- or zinc-containing species phase. The metal-containing species phase can be distributed through at least a portion of the aggregate and is an intrinsic part of the aggregate.

Further, it is within the bounds of the present invention to have a metal-treated carbon black containing more than one type of metal-containing species phase or the metal-treated carbon black can also contain a silicon-containing species phase and/or a boron-containing species phase. For example, the metal-treated carbon black of the present invention can have an aggregate comprising a carbon phase, an aluminum-containing species phase, and a zinc-containing species phase. Accordingly, the multi-phase aggregates used in the present invention can have two or more different types of metal-containing species phases and/or additional non-metal species phases.

Preferably, for purposes of the present invention, the amount of elemental silicon and/or elemental metal present in the multi-phase aggregate is from about 0.1 to about 25 wt. %, more preferably, from about 0.5 wt. % to about 10 wt. %, and most preferably from about 0.2 wt. % to about 5.4 wt. %, by weight of the aggregate.

The details of making the multi-phase aggregates are explained in U.S. Pat. Nos. 5,904,762; 5,877,238; 5,869,550; and 5,830,930; PCT Publication No. WO 96/37547, U.S. patent application Ser. No. 08/828,785, filed Mar. 27, 1997, now U.S. Pat. No. 6,017,980; U.S. patent application Ser. No. 08/837,493, filed Apr. 18, 1997, now U.S. Pat. No. 5,904,762; and U.S. patent application Ser. No. 09/061,871 filed Apr. 17, 1998, now U.S. Pat. No. 6,057,387. All are hereby incorporated in their entireties herein by reference.

An at least partially silica-coated carbon product can also be used as the carbon product, which is described in PCT Application No. WO 96/37547, published Nov. 28, 1996, and is hereby incorporated in its entirety herein by reference.

In an additional embodiment of the present invention, the catalyst layer which contains the modified carbon product can undergo an ion exchange reaction with the metal catalyst such as Pt. The cationic metal catalyst complex can be attached or absorbed onto the modified carbon products. Organic groups on the modified carbon products can be strongly acidic and thus function as excellent proton conductors in a fuel cell. Having the metal catalyst in very close proximity to the organic groups makes it quite possible to form an active layer with a catalyst, proton conductor, and electron conductor in extremely close proximity to each other which permits excellent catalyst utilization. Furthermore, the particular organic groups on the carbon product can be regenerated. Thus, the functionalized carbon product can be subjected to several cycles of ion exchange, reduction, and drying to achieve any desired loading of noble metal regardless of the carbon product surface area. Preferably, the carbon product surface area is high in order to achieve a higher attachment level which results in smaller noble metal crystallites. Furthermore, with the attachment of organic groups on the carbon product, the ratio of micropore-free surface area to total surface area is significantly increased which in turn reduces catalyst lost in micropores.

As an option, the catalyzed treated carbon products can be made partially or fully hydrophobic by contacting the carbon product with an aqueous solution of a fluoronated material (e.g. a fluoronated cationic surfactant such as ZONYL FSD from DuPont). The use of a fluoronated cationic surfactant leads to the further modification of the organic group onto the carbon product. For instance, when the organic group is —$C_6H_4SO_3H$, the following reaction preferably occurs:

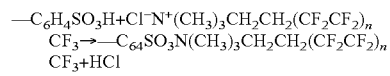

In addition, in forming the catalyst layer, the use of modified carbon products especially with hydrophilic organic groups present, permits the dispersibility of the modified carbon products and aqueous solutions such as water or methanol and permits the forming of a thin proton conducting catalyst layer which can be formed directly, for instance, on the membrane. Thus, a uniform and thin catalyst layer can be formed with the present invention which is different from conventional catalyzed dispersions containing PFSA which cannot be applied in such a manner because the solvent, such as isopropanol, added to keep the PFSA in solution distorts the membrane. Thus, the present invention permits the formation of catalyst layers directly on the fuel cell membrane.

In addition, with respect to the membrane, in an embodiment of the present invention, the membrane (e.g., solid polymer electrolyte membrane) can contain modified carbon products which avoids loss in ionic conductivity. As mentioned previously, the equivalent weight of fluoropolymers such as Nafion binder is about 1100 while the equivalent weight of certain organic groups on a carbon product can equal or be even smaller than that in Nafion binder. For example, attachment of 4 micromols/$m^2$ of —$C_6H_4SO_3H$ to carbon blacks with t-areas of 300 and 600 $m^2/g$ provided equivalent weights of 1000 and 574 respectively. Thus, the incorporation of modified carbon products, such as carbon black with a high level of attached organic groups such as —$C_6H_4SO_3H$ onto the membrane can reduce the extent of crossover without adversely effecting proton conductivity. Furthermore, the reduced crossover preferably permits the use of thinner membranes resulting in diminished ohmic losses in fuel cells. Preferably, the amount of modified carbon product present in the membrane does not exceed the membrane's percolation threshold. Thus, preferably the largest possible modified carbon product loading can be achieved with the use of functionalized carbon products such as modified carbon blacks with low structural levels. By using the modified carbon products of the present invention, reductions in the thickness of the membrane can be achieved without adversely effecting crossover. For instance, a reduction of at least 5% in the thickness of the membrane can be achieved and more preferably at least 10% reduction and even more preferably at least a 15% reduction in the thickness of the membrane can be achieved without adversely effecting crossover.

In forming the blocking layer or the active layer, the modified carbon product can be combined with at least one binder to form a paste which will then be used to form a layer. The paste which forms the layer is typically put on a conductive substrate such as a nickel substrate or other conductive metal substrate or material. While the blocking layer and/or the active layer can contain any type of modified carbon product, when a modified carbon product forms the blocking layer, it is preferred that the modified carbon product be hydrophobic in nature. Thus, it is preferred that the modified carbon product comprise at least one carbon product having attached at least one organic group which is hydrophobic in nature. In other words, it is preferred that a hydrophobic organic group be attached to the carbon product to form the modified carbon product.

Preferably, the organic groups attached onto the carbon product are proton conducting groups and/or electron conducting groups.

Examples of hydrophobic organic groups which are attached to the carbon product include, but are not limited to, 1) saturated and un-saturated alkyl groups, aryl groups, ethers, poly ethers, 2) fluorinated saturated and un-saturated alkyl groups, aryl groups, ethers, poly ethers; 3) poly or oligo fluorinated compounds, and the like.

Preferably, the organic group which is attached to the carbon product to promote the hydrophobic properties has the general formula —A—R, wherein A is an aromatic group and/or an alkyl group and R represents fluorine and/or a fluorine containing substituent. The alkyl group is preferably a $C_1$-$C_{20}$ alkyl group and more preferably is a $C_1$-$C_{12}$ alkyl group. The aromatic group can include multiple rings. Also, more than one R group can be located on the aromatic group and each of these R groups can be the same or different. More preferably, the hydrophobic group is Ar—$CF_3$ where —$CF_3$ is preferably in the meta position.

With respect to the active layer, as stated earlier, preferably the active layer contains a modified carbon product which promotes hydrophilic and hydrophobic characteristics. In order to promote the hydrophilic characteristics of the carbon product which has a tendency to be naturally hydrophobic, the carbon product preferably has attached at least one type of hydrophilic organic group which can be an aromatic or alkyl group substituted with an ionic group; an ionizable group; a non-ionic hydrophilic group; or a mixture thereof. Preferably, the hydrophilic type organic group is a sulfophenyl group or a carboxyphenyl group, or salts thereof. Examples of the ionic or ionizable group include, but are not limited to, sulfonilic acid groups and salts thereof. Alternatively, the carbon product can have attached at least one type of hydrophobic organic group and can be used in forming the active layer.

In more detail, ionizable functional groups forming anions include, for example, acidic groups or salts of acidic groups. The organic groups, therefore, include groups derived from organic acids. Preferably, when the organic group contains an ionizable group forming an anion, such an organic group has a) an aromatic group or a $C_1$-$C_{12}$ alkyl group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group or the alkyl group of the organic group is directly attached to the carbon product. The aromatic group may be further substituted or unsubstituted, for example, with alkyl groups. The $C_1$-$C_{12}$ alkyl group may be branched or unbranched and is preferably ethyl. More preferably, the organic group is a phenyl or a naphthyl group and the acidic group is a sulfonic acid group, a sulfinic acid group, a phosphonic acid group, or a carboxylic acid group. Examples include —COOH, —$SO_3H$, —$PO_3H_2$, —$SO_2NH_2$, —$SO_2NHCOR$, and their salts, for example —COONa, —COOK, —$COONR_4^+$, —$SO_3Na$, —$HPO_3Na$, —$SO_3NR_4^+$, and $PO_3Na_2$, where R is an alkyl or phenyl group. Particularly preferred ionizable substituents are —COOH and —$SO_3H$ and their sodium, potassium, lithium salts. It is understood these cationic counter ions can be exchanged to other ions through an ion-exchange process.

Most preferably, the organic group is a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo) naphthyl group or a salt thereof. A preferred substituted sulfophenyl group is hydroxysulfophenyl group or a salt thereof. Specific organic groups having an ionizable functional group forming an anion are p-sulfophenyl, 4-hydroxy-3-sulfophenyl, and 2-sulfoethyl. More preferred examples include p-$C_6H_4SO_3^-Na^+$ and $C_6H_4CO_2^-Na^+$.

Amines represent examples of ionizable functional groups that form cationic groups and can be attached to the same organic groups as discussed above for the ionizable groups which form anions. For example, amines may be protonated to form ammonium groups in acidic media. Preferably, an organic group having an amine substituent has a pKb of less than 5. Quaternary ammonium groups (—$NR_3^+$), quaternary phosphonium groups (—$PR_3^+$), and sulfonium groups (—$SR_2^+$) also represent examples of cationic groups and can be attached to the same organic groups as discussed above for the ionizable groups which form anions. Preferably, the organic group contains an aromatic group such as a phenyl or a naphthyl group and a quaternary ammonium, a quaternary phosphonium group, or a sulfonium group. The aromatic group is preferably directly attached to the carbon product. Quaternized cyclic amines and quaternized aromatic amines can also be used as the organic group. Thus, N-substituted pyridinium compounds, such as N-methyl-pyridyl, can be used in this regard. Examples of organic groups include, but are not limited to, 3-$C_5H_4N(C_2H_5)^+$, $C_6H_4NC_5H_5^+$, $C_6H_4COCH_2N(CH_3)_3^+$, $C_6H_4COCH_2(NC_5H_5)^+$, 3-$C_5H_4N(CH_3)^+$, and $C_6H_4CH_2N(CH_3)_3^+$. Counter ions to those groups include, but are not limited to, $Cl^-$, $NO_3^-$, $OH^-$, and $CH_3COO^-$. It is understood that these anionic counter ions can be exchanged to other ions through an ion-exchange process.

As stated earlier, non-ionic hydrophilic groups can be used. Examples of the non-ionic hydrophilic groups include, but are not limited to, groups having no apparent ionic change and can not be transformed to have an ionic charge, such as polymers/oligomers of the ethylene oxide, propylene oxide, other alkylene oxides, glycols, alcohols, and the like.

As part of the present invention, it is preferred that the amount of hydrophilic organic groups attached to the carbon product is controlled in order to avoid making the modified carbon product overly hydrophilic. In particular, as a preferred embodiment of the preferred invention, the treatment level, which is expressed in terms of $\mu mol/m^2$ of carbon, of the hydrophilic organic group on the carbon product is from about 0.04 $\mu mol/m^2$ to about 6 $\mu mol/m^2$, more preferably from about 0.1 $\mu mol/m^2$ to about 2 $\mu mol/m^2$, and most preferably from about 0.2 $\mu mol/m^2$ to about 0.8 $\mu mol/m^2$.

In a more preferred embodiment of the present invention, the carbon product which has attached at least one hydrophilic organic group, also has attached at least one hydrophobic organic group as well to better promote a hydrophobic/hydrophilic balance in the active layer. The hydrophobic organic groups can be the same as described above. For purposes of this preferred embodiment of the present invention, the treatment level of the hydrophobic organic group on the modified carbon product is preferably from about 0.04 $\mu mol/m^2$ to about 6 $\mu mol/m^2$, more preferably from about 0.1 $\mu mol/m^2$ to about 4 $\mu mol/m^2$, and most preferably from about 0.5 $\mu mol/m^2$ to about 3 $\mu mol/m^2$.

Alternatively, instead of a dual or multi-treated modified carbon product as described above in the preferred embodiment, two or more different types of modified carbon products can be used, in particular, one modified carbon product can be a carbon product having attached at least one hydrophilic organic group and a second type of modified carbon product can be used which is a carbon product having attached at least one hydrophobic organic group. Then, in this embodiment, a mixture of the two different types of modified carbon products can be used to form the active layer along with the optional presence of a binder.

Any carbon products that are used in diffusion electrodes can be used in the present invention. Examples of such carbon products include, but are not limited to, graphite, carbon black, vitreous carbon, activated charcoal, carbon fiber, activated carbon, and carbon aerogel. Catalyzed carbon products that are used in diffusion electrodes can also be used in the present invention, wherein surface modification can be performed either before or after the catalization step. Finely divided forms of the above are preferred. Further, mixtures of different carbon products can be used. Preferably, the carbon product used is capable of reacting with a diazonium salt to form the above-mentioned carbon products. The carbon may be of the crystalline or amorphous type. In addition, mixtures of different types of modified carbon products with or without unmodified carbon products can also be used in the present invention as one embodiment.

Examples of the organic groups which are attached onto the carbon product to form a modified carbon product and methods to attach organic groups are described in the following U.S. patents and publications which are all incorporated in their entirety by reference herein: U.S. Pat. Nos. 5,851,280; 5,837,045; 5,803,959; 5,672,198; 5,571,311; 5,630,868; 5,707,432; 5,803,959; 5,554,739; 5,689,016; 5,713,988; WO 96/18688; WO 97/47697; and WO 97/47699.

Besides the presence of the modified carbon product in one or more components of the electrode described above, conventional ingredients used in electrodes can also be present in the electrodes of the present invention. For instance, fluorine containing compounds typically used in diffusion electrodes can also be used in the present invention such as polytetrafluoroethylene in the blocking layer. Likewise, in the active layer, a perfluoric sulphonic acid polymer sold under the trade name Nafion® can be used with the modified carbon products. However, one preferred advantage of the present invention is the ability to reduce such fluorine containing compounds in the blocking layer and/or active layer. The proper choice of organic groups attached onto the carbon product to form the modified carbon product can lead to a decrease if not an elimination of fluorine containing compounds which in the past have been used in conjunction with carbon black in order to promote the hydrophilic and/or hydrophobic properties discussed above. The reduction or elimination of such fluorine containing compounds can greatly reduce the cost of the electrodes and thus the present invention provides a very economical electrode. Preferably, for purposes of the present invention, the amount of the reduction of a hydrophobic fluorine containing compound in the blocking layer is from about 10 to about 100% by weight, more preferably from about 40 to about 100% by weight. Further, with respect to the active layer, preferably the amount of reduction of the fluorine containing compound is from about 10 to about 100% by weight, more preferably from about 60 to about 100% by weight.

Catalyst utilization has been rather poor in conventional fuel cells because of the nature of the interface. It was found that, in conventional electrodes, a large part of the catalyst is not effective. The electrochemical reaction takes place only in those areas where catalyst is accessible both to the reactant gas and the electrolyte. PTFE makes the catalytic layer partly impermeable to the electrolyte so that the catalyst efficiency is lowered, also resulting in the decrease of the electrode performance. On the other hand, a large amount of PTFE is required in the gas diffusion layer to prevent the electrolyte diffusivity over a long period of time. This results in the reduction of the gas mass transport efficiency due to the blocking effect of PTFE inside the fine porous structure.

Since the modified carbon products of the present invention promote hydrophobic and/or hydrophilic properties on a molecular scale, there is no random wetting of the carbon products and a very even distribution of the wetting characteristics exists throughout the active layer for instance. Thus, the unwanted excessive wetting of the carbon products can be avoided throughout the entire active layer which then leads to a long term operation thus promoting the extension of the service life of the electrode. Further, with respect to the blocking layer, with a modified carbon product having attached hydrophobic organic groups, the blocking layer quite effectively blocks any electrolyte and permits the greatest amount of air diffusion.

The fuel cells and the components of the fuel cell, including the electrodes described in U.S. Pat. Nos. 5,783,325; 5,521,020; 5,733,430; 5,561,000; and 5,116,592 can be used in the present invention and these patents are incorporated in their entirety by reference herein. These patents provide examples of catalyst particles, fluoropolymers, various layers of electrodes and the like which can be used herein or can be further modified as described here with the modified carbon product or the modified carbon product associated with the catalyst.

Figure 4:
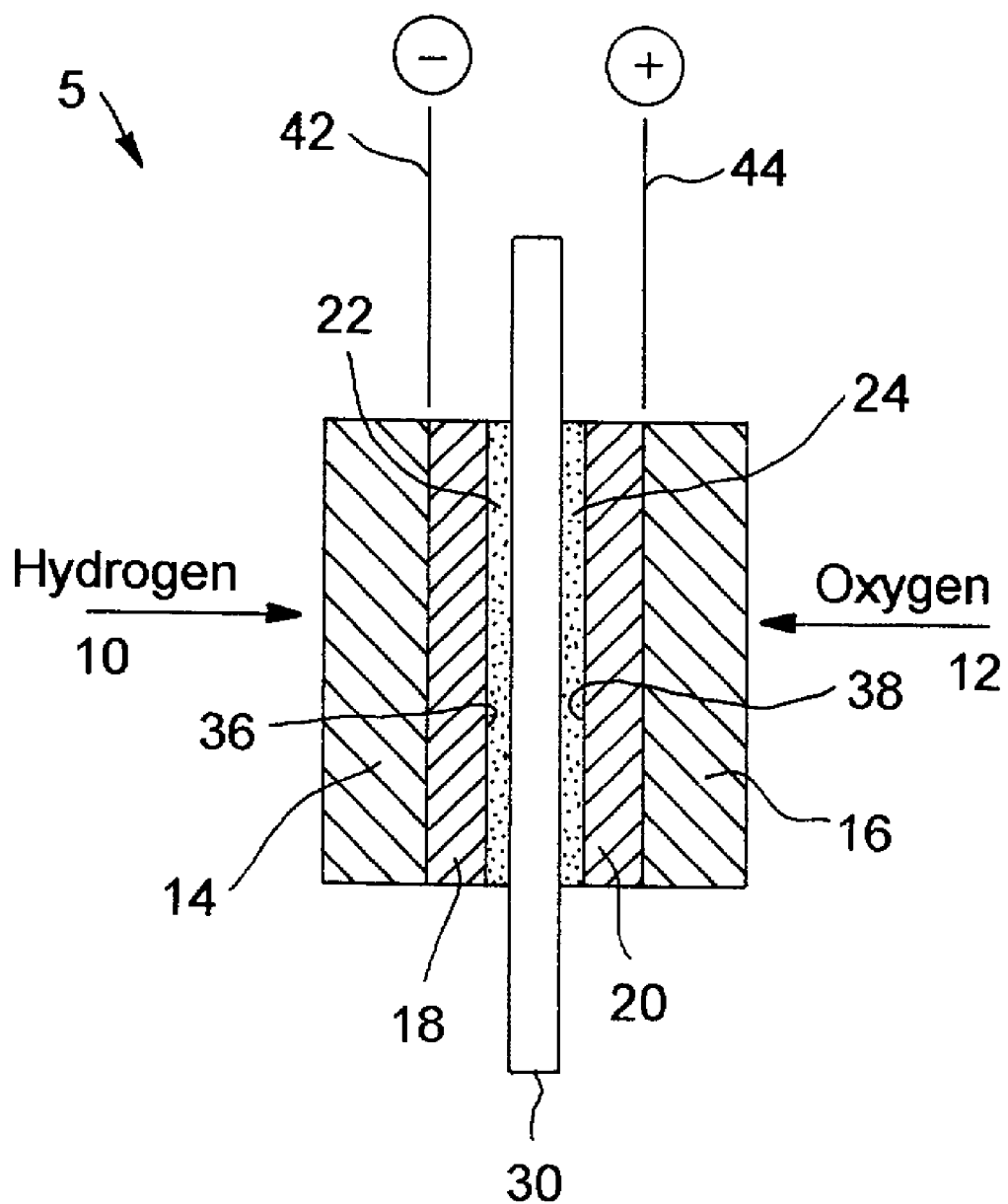
FIG. 4 illustrates a fuel cell which can be used in the present invention.

FIG. 4 provides one example of a fuel cell 5 wherein electrodes 18 and 20 are shown, and wherein 36 and 38 depict catalyst layers. Anode connection 42 and cathode connection 44 are shown and are connected to an external circuit (not shown). 22 and 24 reflect optional electrolyte deposits that are in contact with the solid membrane 30. The fuel cell includes gaseous reactants, such as a fuel source 10 and an oxidizer source 12, wherein the gases 10 and 12 diffuse through anode backing layer 14 and cathode baking layer 16, respectively, to porous electrodes forming an oxidizing electrode or anode 18 and a reducing electrode or cathode 20. Further details of this conventional fuel cell are set forth in U.S. Pat. No. 5,521,020 and the other patents referenced above.

Further to the above embodiments and as an additional embodiment that can be used separately with various fuel cells and other devices that use catalysts, the present invention further involves methods to deposit catalyst on substrates or support such as carbon black supports. In the methods, a catalyst containing composition, such as a metal catalyst like platinum, is reacted with a modified carbon product, wherein the modified carbon product preferably has an attached organic group which is ionic and preferably anionic. The catalyst is preferably a metal catalyst which is in the form of an ionic metal catalyst precursor (e.g., a cationic metal catalyst containing composition), such as those described below. In the reaction, a modified carbon product is formed having attached an ionic group associated with a counterionic catalyst group. Examples of such groups are shown below as well. This modified carbon product that contains the ionic group associated with the counterionic catalyst group is then subjected to a reducing process by using a reducing agent to reduce the counterionic catalyst group to a metal catalyst in order to deposit the metal catalyst on the modified carbon product. Examples of reducing agents preferably include gases or liquids, such as hydrogen gas with or without an inert gas. Other reducing agents described previously can be used. The reduction can occur at any temperature, for instance from about 80° C. or higher. If contaminants are present such as $NH_4^+$ or $Cl^-$, these contaminants can be removed by passage of the reaction product through a mixed bed of ion exchange resins in $H^+$ and $OH^-$ forms. As shown in Example 2, this process leads to an excellent distribution of the metal catalyst throughout the carbon and this dispersion can then be used to form, using standard techniques, (e.g., mixing the modified carbon product with catalyst with a binder and forming a layer) a carbon support containing the catalyst. Furthermore, extremely small catalyst particle sizes can be formed, e.g., 2 nm or lower or 1 nm or lower which is excellent for fuel cells especially when created on a proton conducting surface.

Catalysts used for the oxygen reduction reaction in fuel cells and gas diffusion electrodes typically contain platinum particles deposited on carbon black supports. Preferably, the maximum catalyst activity is achieved when the Pt particles have mean sizes of from about 2 to about 3 nm and are uniformly distributed on the support material. To achieve this distribution, various methods can be used. For instance, the reduction of $H_2PtCl_6$ in the presence of carbon black can be used. The use of $H_2PtCl_6$ to deposit Pt on carbon blacks with attached organic groups, such as $—C_6H_4SO_3H$ groups, can result in the deposition of Pt particles that are substantially larger than 2 to 3 nm. Moreover, Pt agglomeration can occur, which may indicate less than desirable Pt distribution on the support material. Another method to deposit the Pt particles is to use an ion exchange procedure to deposit the Pt on the carbon products having an attached organic group.

Examples of cationic Pt precursors that can be used include, but are not limited to, $[Pt(NH_3)_4]Cl_2$ and $[Pt(NH_3)_4](OH)_2$. The latter compound is a strong base and particularly attractive for ion exchange with carbon products having attached organic groups, such as attached $—C_6H_4SO_3H$ groups. Addition of $[Pt(NH_3)_4]Cl_2$ to a dispersion of the carbon product preferably results in the equilibrium reaction:

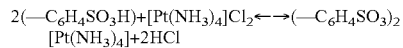

Although the equilibrium reaction can be well to the right, it was found experimentally that some free $[Pt(NH_3)_4]Cl_2$ is present at addition levels which are substantially smaller than that required to achieve complete exchange with the attached $—C_6H_4SO_3H$ groups. On the other hand, addition of the strongly basic $[Pt(NH_3)_4](OH)_2$ to the treated carbon black gives the reaction:

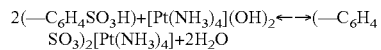

with its equilibrium position being preferably essentially completely to the right as long as the pH of the dispersion is not much greater than about 7.

Figure 9:
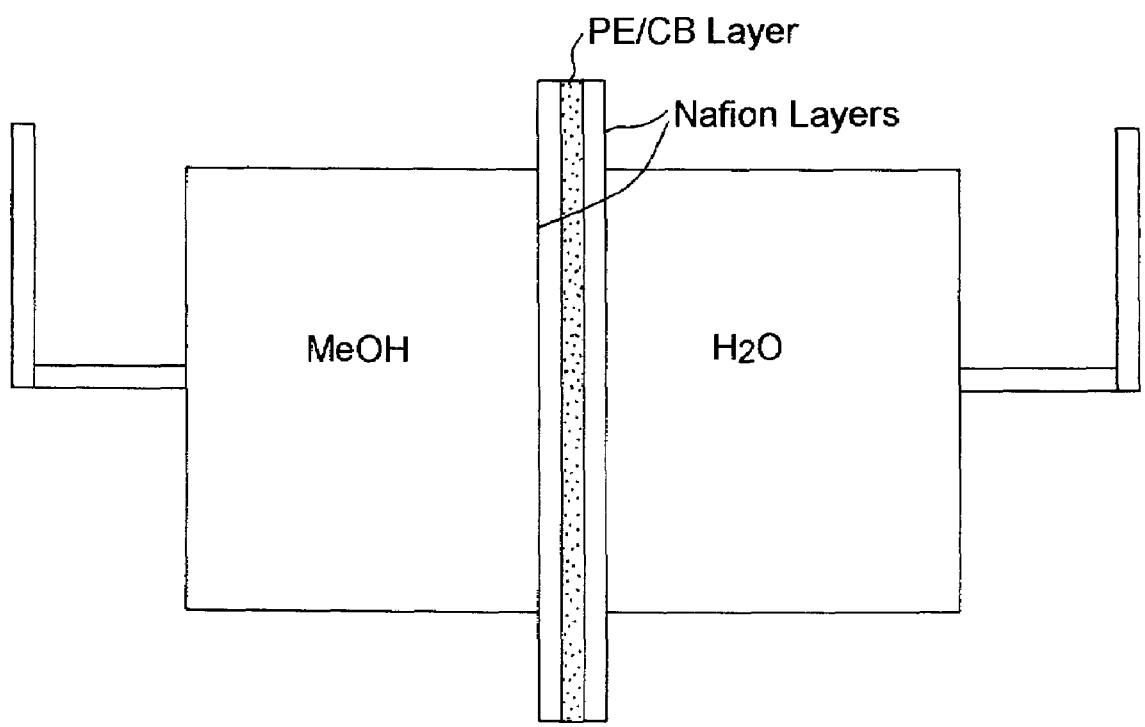
FIG. 9 illustrates a device to measure membrane resistance to methanol permeation.

With respect to direct methanol fuel cells, a membrane which separates the anode from the cathode, can be prepared with two or more layers. In more detail, a membrane can be used in the present invention or with conventional fuel cells wherein a first layer contains modified carbon products as described above alone or with one or more binders such as polymers. An example of a suitable binder is polyethylene. Also, Nafion could also be used as the binder. The second layer which is in contact with the first layer would be a Nafion membrane layer which provides electronic insulation. In another embodiment, a Nafion layer could be located on both sides of the first layer thus creating a sandwich as shown in FIG. 9. The thicknesses of each layer can be conventional thicknesses for membrane layers. As shown in Example 3, the methanol crossover can be greatly reduced using this design along with the modified carbon products. As described in the examples, the various layers can be pressed together by hot pressing or other means to connect various layers together.

In direct methanol fuel cells a Nafion membrane is used to separate the anodic and cathodic reactions. As in a PEM fuel cell, the membrane provides electronic insulation while allowing proton conduction to take place. The oxidation and reduction processes can be represented by the reactions

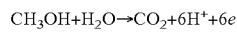

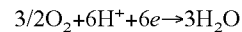

The protons generated in the anodic reaction pass through the Nafion membrane and are converted to water at the cathode. Water and methanol also diffuse through the membrane. Methanol cross-over represents one (of several) major inefficiency in DMFCs. It lowers fuel utilization efficiency and adversely affects oxygen cathode performance. Accordingly, the availability of a proton conducting electron insulating membrane that exhibits reduced methanol cross-over would be a benefit.

As shown above, carbon products with attached organic groups, such as $—C_6H_4SO_3H$ groups (when hydrated) are proton conductors. However, they are also electron conductors. One approach to reducing methanol cross-over is to disperse a low structure, high area carbon product having a large level of attached organic groups, such as $—C_6H_4SO_3H$ groups, into the Nafion membrane at loadings preferably just below its percolation threshold. This is preferred to insure that the membrane remains an electronic insulator.

In another embodiment, an approach can be taken to use a treated carbon product to achieve improved ionic conductivity without substantial impairment in electronic conductivity. This approach can be extended to forming a noble metal supported catalyst having good electronic and ionic conductivities and improved gas access to the noble metal catalyst.

One approach is to improve the electronic and ionic conductivities of catalyst layers. This approach is based on the use of a conventional supported noble metal catalyst. The support may be a carbon black, acetylene black, or a conductive black such as Ketjen EC, or other carbon product. It involves depositing and bonding the catalyst to a suitable substrate and then treating the bonded layer to attach an organic group(s), such as —$C_6H_4SO_3H$ groups. The procedure preferably encompasses the following steps:

1. Utilize a minimum amount of binder to hold the supported noble metal catalyst together. The binder may be Nafion, Kynar (a polyvinyledene fluoride), PTFE (e.g. DuPont's PTFE 30) and the like, or their mixtures. The amount of binder employed is preferably sufficient to prevent redispersion of the catalyst layer in water after subjecting it to an attachment treatment to attach organic groups, such as —$C_6H_4SO_3H$ groups. The catalyst layer can be then be deposited either on the gas diffusion layer or, if the decal method is employed, on a suitable substrate (such as on a TEFLON substrate). Less preferably, it can be deposited on a perfluorosulfonic acid membrane such as a Nafion membrane.
2. The organic group can then be attached onto the catalyst layer, such as by diazotizing the catalyst layer to attach the organic group, such as an appropriate level of —$C_6H_4SO_3Na$ groups to the carbon surface. The attachment, such as the diazonium reaction, can be conducted in either water or, to improve wetting, in a mixture of water and iso-propanol. The treated layer is then be washed, treated with acid to convert the attached groups to their $H^+$ form and washed free of acid.
3. Use standard procedures to incorporate the catalyst layer in a membrane electrode assembly.

With this approach, the extent of treatment in areas where aggregates are in contact is preferably small. As a consequence, the loss in electronic conductivity is smaller than that achieved when the catalyst layer is formed from a treated catalyzed support. Since the interaggregate contact area is small, a high treatment level can be achieved and, accordingly, the gain in ionic conductivity is large.

Another approach is to improve the electronic and ionic conductivities and noble metal accessibility in catalyst layers, A possible drawback to the above procedure is that the binder(s) and/or treatment can impede access of gas to the surface of the supported noble metal catalyst (e.g., by being deposited on the catalyst surface). Thus, an improved catalyst layer can be formed using the following steps:

1. Utilize a minimum amount of binder to form a bonded layer of a preferred, untreated carbon deposited on a suitable substrate. The binder may be Nafion, Kynar, PTFE, and the like, or their mixtures. The amount employed is preferably sufficient to prevent redispersion of the carbon product in water after subjecting it to an attachment treatment, such as a diazonium treatment to attach an organic group, such as —$C_6H_4SO_3H$ groups. The substrate can be either the gas diffusion layer or a decal. The use of a perfluorosulfonic acid membrane as a substrate is optional.
2. Treat layer in water or in a water/isopropanol mixture to attach a high level of the organic group, such as —$C_6H_4SO_3Na$ groups. Wash layer, acid treat to convert the attached group to an acid, such as converting attached groups to —$C_6H_4SO_3H$ and wash again to remove excess acid.
3. Soak washed layer in a solution of $[Pt(NH_3)_4](OH)_2$ and then wash off excess solution. For instance, it should be noted that each mole of attached —$C_6H_4SO_3H$ groups reacts with (neutralizes) ½ mole of the Pt compound.
4. Reduce the $Pt^{2+}$ compound in the layer to Pt(o) and regenerate the attached acid group, e.g., —$C_6H_4SO_3H$ groups. Reduction can be carried out in a mixture of $H_2/N_2$ at a temperature of about 120 to 140° C. Alternately, reduction can be effected in aqueous media with either hydrazine or electrochemically. After reduction, the membrane can be treated with acid to convert any —$C_6H_4SO_3NH_4$ to —$C_6H_4SO_3H$. If desired, steps 3 and 4 can be repeated to attain increased Pt(o) levels.
5. Use conventional procedures to form MEA from catalyst layer.

The present method of MEA preparation has several potential advantages. It should provide a high degree of proton conduction with minimal loss in electronic conduction. In addition, since the noble metal is deposited on a bound and treated carbon product layer, neither the binder nor the treatment can hinder access of oxygen (or hydrogen) to the catalyst. Finally, this approach may provide a more convenient (and less costly) method of forming an MEA.

In addition, the use of modified carbon products can also apply to direct methanol fuel cells with the obtaining of similar benefits as described above. Furthermore, the use of modified carbon products in direct methanol fuel cells has the ability to reduce methanol crossover.

Besides air electrodes, the present invention relates to gas diffusion electrodes in general, wherein the active layer and/or blocking layer that may be present in gas-diffusion electrodes can include modified carbon products as described above and serve the same function as the modified carbon products incorporated in the active layer and/or blocking layer of the electrode. Gas-diffusion electrodes, which include air-diffusion electrodes, prepared with modified carbon material have broad applications. One example of a gas diffusion electrode application would be a phosphoric acid type fuel-cell using a pair of gas diffusion electrodes. Such gas diffusion electrodes are described, for instance, in U.S. Pat. Nos. 5,846,670; 5,232,561; and 5,116,592, and all incorporated in their entirety by reference herein. Other applications are described in EP 435835, (Electro-plating); U.S. Pat. Nos. 5,783,325; 5,561,000; 5,521,020 (Solid polymer electrolyte fuel cells); U.S. Pat. No. 5,733,430 (Sodium chloride electrolysis); U.S. Pat. No. 5,531,883 (Ozone generation cells); U.S. Pat. No. 5,302,274 (Gas Sensor); U.S. Pat. No. 4,892,637 (Alkali chloride electrolyzers, air cells, and fuel cells); EP 327 018 A2 (Biosensors); A. Kaishera et al., Sens. Actuators, 1995, 1327 ((1-3) (Biosensors), all are incorporated herein in their entirety by reference.

The present invention can be used in a variety of gas diffusion electrodes. For instance, but without limiting the present invention, the present invention can be used in large scale industrial applications, such as chemical production. Examples of such industrial applications include, but are not limited to, chloro-alkali production (e.g., the production of sodium hydroxide also known as salt splitting and chlorine production); hydrogen peroxide production; and the like. The present invention can also be used, as discussed above, in fuel cells, metal/air batteries, electro-platting (e.g., using hydrogen gas); ozone production, carbon dioxide decomposition; sensors for such chemicals as ozone, oxygen, nitrogen dioxide, and the like; enzyme/gas diffusion electrodes (e.g., biosensors); and the like. Each of these applications can incorporate the modified carbon material of the present invention in the electrode to obtain the benefits discussed above and one skilled in the art in view of the disclosure set forth in this present invention can apply this present invention to these various applications and therefore are considered part of the present application.

The following examples further illustrate aspects of the present invention but do not limit the present invention.

EXAMPLES

Example 1

Five membrane electrode assemblies (MEA's) were constructed. The reagents used were Pt black and 20 weight % Pt on VULCAN XC 72 carbon black (both from Alfa Aesar), Teflon PTFE 30 dispersion (DuPont) containing 60 weight % PTFE, hydrophobic Toray paper (Toray), Nafion 117 membrane (DuPont), Nafion solution, 5 weight % (Electrochem, Inc.) and Kynar 721 polyvinylidene fluoride powder (AtoFina). All MEA's were fabricated with a Nafion 117 membrane and an anode that consisted of 4.0 mg Pt black/cm$^2$. Four MEA's were constructed using a standard procedure wherein the supported catalyst was bonded with PTFE. In these cases, a dispersion consisting of 90 parts of the supported Pt catalyst and 10 parts PTFE was mixed by sonication, flocculated by acidification to pH 3, and dried at 105° C. The powder was then deposited on the 2 hydrophobic Toray paper to form a catalyst layer containing 0.5 mg Pt/cm$^2$. The catalyst layer was heated at 360° C. for 30 minutes to sinter the PTFE and bond the catalyst to itself and the paper. In the case of the fifth MEA, the supported catalyst was treated so as to attach —$C_6H_4SO_3H$ to the carbon surface. Since the attached groups undergo thermal decomposition at elevated temperatures, the fifth MEA was bonded with Kynar 721. It should be noted that the onset for decomposition for the product with H$^+$ as the counterion is about 120 to 130° C. and that when Na$^+$ is the counterion is about 160 to 170° C. The four "standard" MEA's were fabricated as follows:

- MEA I—the catalyst layer (backed by the hydrophobic Toray paper) was hot pressed onto a hydrated Nafion 117 membrane at 177° C. at a pressure of 2.4 to 2.8 MPa for 10 minutes. This MEA contains no SO$_3$H groups.
- MEA II—the 5% Nafion solution was diluted with isopropanol and sprayed onto the catalyst layer to achieve a 0.5 mg Nafion/cm$^2$ loading. The catalyst was then dried at 90 to 100° C. and then bonded to the membrane using the same procedure as for MEA I. The Nafion solution (EW=1100) introduced 0.45 μmoles/cm$^2$ of SO$_3$H groups.
- MEA III—the PTFE bonded catalyst layer was treated in an aqueous solution to attach —$C_6H_4SO_3Na$ groups to the carbon support. The catalyst layer/Toray paper combination (91 cm$^2$, weighing 1.3236 g and containing about 180 mg of the carbon support) was placed, catalyst face down, in a tray containing 1500 cc of water and 50 g sulfanilic acid maintained at 70° C. The solution was circulated by means of a peristaltic pump. To the solution 20 g of sodium nitrite dissolved in 200 ml of water was added over 30 minutes. Circulation of the solution was continued for another 2 hours. Thereafter, the solution was allowed to cool, the structure removed, washed with water, methanol, and finally rinsed with water and dried. The resulting structure weighed 1.3257 g. The weight gain, 2.1 mg, was small and indicated that no more than 0.13 μmoles/cm$^2$ —$C_6H_4SO_3Na$ were attached. The structure was bonded to the membrane using the same procedure as for MEA I.
- MEA IV—the PTFE bonded catalyst layer was treated in an aqueous solution containing 9 volume % isopropanol (IPA) to attach —$C_6H_4SO_3Na$ groups to the carbon support. The isopropanol was added to aid wetting of the catalyst layer. The catalyst layer/Toray paper combination (about 50 cm area, weighing 0.6508 g) was placed, catalyst face down, in a tray containing 1500 cc of water, 150 cc of isoproponal, and 10 g sulfanilic acid maintained at 70° C. The solution was circulated by means of a peristaltic pump. To the solution 4.2 g of sodium nitrite dissolved in 100 ml of water was added over 30 minutes. Circulation of the solution was continued for another 2 hours. Thereafter, the solution was allowed to cool. The resulting structure was washed with isopropanol followed by methanol and water and finally dried at 75° C. for two hours. The structure weighed 0.6524 g, indicating that the treatment introduced about 0.2 μmoles/cm of —$C_6H_4SO_3Na$ groups. Since the catalyst layer in the structure appeared more pitted after treatment, some loss of catalyst had occurred. Thus, it is likely that the actual amount attached exceeded the figure of 0.2 μmoles/cm$^2$. The dried structure was soaked in I M HCL solution (to replace the Na$^+$ counterion with H$^+$), soaked in water, rinsed, dried, and then bonded to the membrane using the same procedure as for MEA I.
- MEA V—5 g of supported catalyst and 1.3 g of sulfanilic acid in 45 ml of water were stirred and heated to 65° C. Sodium nitrite, 0.52 g, in the form of a 20 weight % aqueous solution was added to it dropwise over 30 minutes. The reaction mixture was stirred for an additional 1.5 hours. The mixture was cooled and then transferred to a dialysis bag (cellulose membrane from Sigma Chemicals with a 12 k molecular weight cut off). The reaction mixture was dialyzed four times with 3000 g aliquots of deionized water, with a change to fresh water every 10 hours. The dialyzed product was then passed through a bed of Dowex MSC-1 macroporous ion (cation) exchange resin (Aldrich). The resin had been previously converted into it H$^+$ form by first contacting with excess I M sulfuric acid and then washing it free of sulfate ions. After ion exchange, the dispersion was dried in a vacuum oven at 65° C. Sulfur and sodium analysis indicated that the treated product contained 0.60 mmoles/g of attached —$C_6H_4SO_3$ groups with about 94% of them having H$^+$ as their counterion.

The treated catalyst was dispersed in water and reconverted to its Na$^+$ by addition of NaOH to a pH of 8. The resulting dispersion was filtered and dried and mixed with 25 weight % Kynar 721 powder. The resulting mixture was deposited on the hydrophobic Toray paper and the heated at 170° C. for 30 minutes to bond the catalyst layer. Thereafter, the structure was soaked in sulfuric acid (to replace the Na$^+$ with H$^+$) soaked and washed with water, dried, and then bonded to the membrane using the same procedure as for MEA I. The catalyst layer contained 0.45 mg/cm$^2$ of Pt and 1.1 μmoles/cm$^2$ of —$C_6H_4SO_3H$ groups.

Fuel Cell Performance

The utility of the MEA's in fuel cell applications was investigated. The MEA's (46.4 cm$^2$) were tested at 82° C. with humidified gases at 0.2 MPa gauge pressure. Hydrogen was the fuel. Oxygen and air were employed as the cathode feeds. Stoichiometric excesses were 33% for oxygen and 2.6 fold for air. The MEA's were conditioned for about 30 minutes at the operating temperature at 430 mA/cm$^2$. After an initial polarization, the cells were operated for a further six hours using H$_2$/air as the gas feeds. Thereafter, the polarization curves with oxygen and air as the cathode feeds were obtained. For clarity, only those obtained for MEA I, MEA II and MEA IV with oxygen are depicted in FIG. 1. The curves were obtained by fitting the experimental points to the relationship $$V = E_1 - b(\log i) - Ri \quad (1)$$

where V is the cell voltage, $E_1$ is the voltage intercept at 1 mA/cm², b is the Tafel slope and R is the resistance. The data for all MEA's were well represented by Equation 1. The experimental points about the fitted curves for MEA I, II and IV are shown in the figure.

The performance of MEA I, having no proton conducting groups (i.e., no —$SO_3H$ groups) is poor at all current densities. The conventional procedure of addition of Nafion, as shown by the curve for MEA II, results in a substantial enhancement in performance. As 2 shown by the data for MEA IV, attachment of —$C_6H_4SO_3H$ groups (>0.2 mmoles/cm²) to the carbon support yields a polarization curve that is essentially identical with that obtained for MEA II containing Nafion as the proton conductor. Accordingly, the present data confirms the view that the attached —$C_6H_4SO_3H$ groups function as proton conductors.

The values of $E_1$, b, and R obtained by the regression analyses are summarized in Table 1. The resistance values found by impedance spectroscopy at 1000 Hz, providing a measure of the electronic and ionic resistances, are also included in the table. The results show that MEA II and IV have smaller Tafel slopes and large $E_1$ values than MEA I, accounting for their better performances. In the case of MEA III the regression analysis gives a large Tafel slope as well as a relatively large R value, accounting for its poor performance at the higher current densities. Although no reason can be provided to account for its large Tafel slope, it is likely that the relatively poor performance of MEA III can be attributed to the presence of an insufficient number of attached —$C_6H_4SO_3H$ groups. The superior performance of MEA IV, having a larger level of attached —$C_6H_4SO_3H$ groups is consistent with this view.

TABLE 1

Values Derived By Regression Analysis and Impedance Spectroscopy

| MEA | Regression Analysis | | | *IS |
|---|---|---|---|---|
| | $E_1$ Volts | b mV/dec | R, V/100 A/cm² | R, V/100A/cm² |
| I-No Treatment (0 µmoles/cm² $SO_3H$) | 0.967 | 0.066 | 29.4 | 37 |
| II-Nafion (0.45 µmole/cm² $SO_3H$) | 1.001 | 0.062 | 21.5 | 17 |
| III-Aqueous Treatment (~0.1 µmoles/cm² $SO_3H$) | 1.005 | 0.080 | 35.4 | 25 |
| IV-Aqueous/IPA Treatment(>0.2 µmoles/cm² $SO_3H$) | 0.999 | 0.048 | 38.9 | 30 |
| V-Kynar Bonded (1.1 µmoles/cm² $SO_3H$) | 0.999 | 0.066 | 46.3 | 17 |

IS = Impedance Spectroscopy

MEA V, with the Kynar bonded catalyst layer, displayed good performance at low current densities but poor performance at high current densities. Flooding was prevalent in this cathode. The regression parameters are those derived when the best performance was observed, as the cathode was going from a transition from being flooded to being dehydrated (effected by introducing dry feed gas into the a flooded system). Under these selected conditions, the $E_1$ and b values for the Kynar bonded MEA V are quite similar to those for MEA II while its R value is much larger. Thus at low current densities (where the effect of R is small) the two MEA's have comparable performance but not at the larger current densities. On the other hand, the resistances of MEA II and MEA V, as measured by impedance spectroscopy) are comparable. This suggests that the poor catalyst performance of MEA V at high current densities is the result of flooding which causes an increase in mass transfer resistance which, in turn, causes the resistance value derived by regression to become large.

Figure 2:
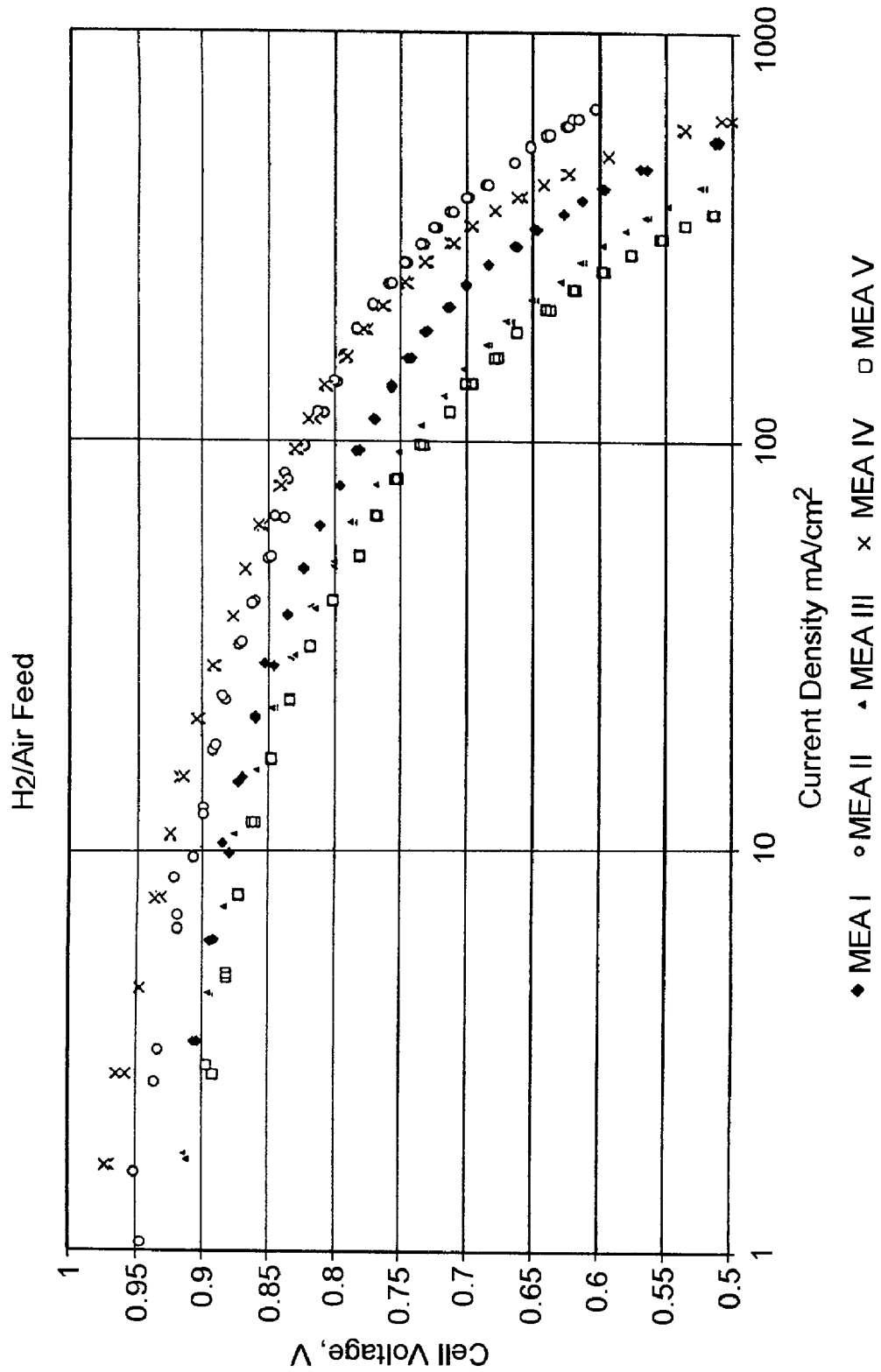
FIG. 2 is a graph showing $H_2$/air feed comparison for several embodiments of the present invention.

The experimental points obtained with air as the oxidant for the same set of MEA's are presented in FIG. 2. They show the same trends as those obtained with oxygen as the oxidant.

Accessible Platinum Surface Area

Figure 3:
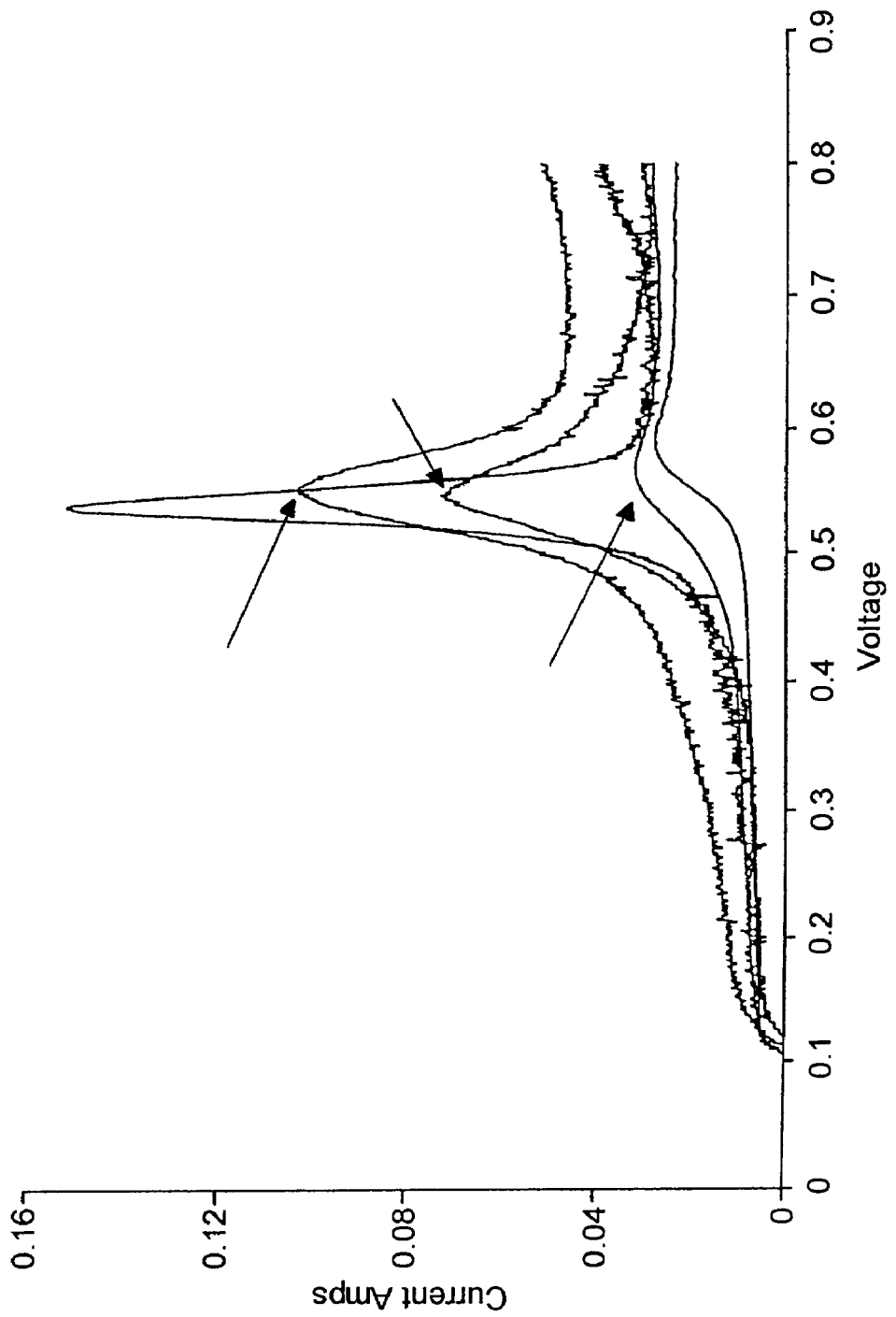
FIG. 3 is a graph providing various data of a CO oxidation curve.

The five MEAs's characterized above were prepared from the same lot of catalyst. Accordingly, the platinum particle size and, hence, platinum specific surface area for the 5 MEA's are identical. The accessible platinum surface area (that is, the surface area of platinum particles which are in ionic contact with the membrane) in the catalyst layers in the five MEA's was determined by means of cyclic voltammetry. For these purposes, oxygen was flushed from the fuel cell cathode flow field using a large excess of nitrogen. Thereafter, a 10 minute feed of 10% CO in $N_2$ was passed into the catalyst layer to cover the platinum surface with CO. The cell was then flushed with nitrogen to remove unadsorbed CO. Finally, the cathode was subjected to a voltage that was increased from 0.1 to 0.8 volts at 2 mV/s to oxidize the adsorbed CO. The curves obtained are depicted in FIG. 3. The accessible surface areas were obtained by integration of the CO oxidation curves and the results obtained are summarized in Table 2.

TABLE 2

Accessible Platinum Areas as Measured by Cyclic Voltammetry

| MEA | Accessible Platinum Surface Area, m²/g |
|---|---|
| I-No Treatment (0 µmoles/cm² $SO_3H$) | 10 |
| II-Nafion (0.45 µmole/cm² $SO_3H$) | 77 |
| III-Aqueous Treatment (~0.1 µmoles/cm² $SO_3H$) | 14 |
| IV-Aqueous/IPA Treatment (>0.2 µmoles/cm² $SO_3H$) | 62 |
| V-Kynar Bonded (1.1 µmoles/cm² $SO_3H$) | 85 |

The results in the table demonstrate that in the absence of proton conducting groups in the catalyst layer, as in the case of MEA I, very little of the platinum, about 10 m²/g, is accessible. Addition of Nafion to the catalyst layer, MEA II, increases the accessible area to 77 m²/g. MEA V having the largest —$SO_3H$ population exhibits the highest, 85 m²/g, accessible catalyst area, demonstrating that attachment of $C_6H_4SO_3H$ groups to the supported catalyst provides effective ionic conductivity. As already noted, flooding caused its poor performance in the fuel application. MEA IV, having more than 0.2 µmoles/cm² of attached $C_6H_4SO_3H$ groups (but less than MEA V) and exhibiting a comparable fuel cell performance to MEA II, has a somewhat reduced, 62 m²/g, accessible platinum area. This may be due to the presence of fewer $SO_3H$ groups than for MEA II. The accessible Pt surface in the case of MEA III is not much larger than that for MEA I suggesting that the level of proton conducting groups, about 0.1 µmoles/cm², are insufficient to allow full Pt accessibility.

Carbon Black Morphology and Treatment Levels

VULCAN XC72, BLACK PEARLS 2000 and CSX 619 were treated to attach various groups to their surfaces. The BET surface areas, the micropore-free surface areas (t-areas), the t-area:BET surface area ratios and micropore volumes of the carbon blacks before and after attachment of the various groups were determined. The results obtained, the groups attached, and their levels are presented in Table 3.

TABLE 3

Effect Of Treatments on Surface Area And Micropore Volumes

| Carbon Black | Group Attached | Level Weight % | BET Area $M^2/g$ | t-Area $m^2/g$ | Micropore Vol., cc/g | t-area: BET area ratio |
|---|---|---|---|---|---|---|
| Vulcan XC72 | None | 0 | 233.4 | 143.7 | 0.040 | 0.62 |
| | —$C_6H_4SO_3H$ | 4 | 182.9 | 126 | 0.023 | 0.69 |
| | —$C_6H_4SO_3H$ | 10.7 | 89.6 | 64 | 0.011 | 0.71 |
| | —$[C_6H_4NC_5H_4]NO_3$ | 5.9 | 143.9 | 122 | 0.009 | 0.85 |
| CSX 619 | None | 0 | 538 | 412 | 0.07 | 0.77 |
| | —$C_6H_4SO_3Na$ | 10 | 367 | 364 | 0.002 | 0.99 |
| BP 2000 | None | 0 | 1446 | 660 | 0.347 | 0.35 |
| | —$C_6H_4SO_3H$ | 26.7 | 316 | 206 | 0.050 | 0.65 |

The results in the table demonstrate that the untreated carbon blacks have relatively large micropore volumes. In general, the micropore volumes of furnace blacks increase with increasing surface areas. For many furnace blacks, the t-area:BET area ratios decrease as surface area is increased, demonstrating that micropores make an increasing contribution to the total surface area. Since diffusion rates in micropores are slow, the accessibility of platinum deposited in such pores will be mass transfer limited. As already mentioned, at a constant platinum deposition level, platinum particle size decreases as support surface area increases. Thus, there is a tradeoff between the benefits of reduced catalyst particle size and reduced catalyst accessibility, making catalyst activity relatively insensitive to support surface area. In the case of CSX 619, however, its t-area:BET area ratio is much larger than those for either VULCAN XC72 or BP 2000 while its t-area lies between them. These features suggest that the tradeoff between decreased catalyst particle size and reduced catalyst accessibility would be improved by using CSX 619 carbon black as the catalyst support. Moreover, since its DBP value (1.0 cc/g) is considerably smaller than those for VULCAN XC72 (1.78 cc/g) or BP 2000 (3.3 cc/g), its use will result in much thinner catalyst layers.

The effect of attachment of surface groups is to reduce BET areas, t-areas and micropore volumes. The extent of these reductions, as shown by the data for VULCAN XC72, increase with attachment level. In all cases, the treatments, regardless of level employed, increases the t-area:BET area ratio. Thus, deposition of the catalyst on a treated support should result in a further enhancement in catalyst accessibility.

Treatment of Acetylene Black with PTFE

As noted previously, the PTFE in the catalyst layer provides hydrophobic pores, assisting mass transfer of gas to the catalyst. Its presence, however, at least partially covers the catalyst. Mass transfer rates to areas where the catalyst surface is covered by PTFE is impeded because it takes place only after dissolution of the gas in the PTFE followed by its diffusion to the catalyst surface. Experiments were conducted to determine the effect of treatment with PTFE on support surface area and the fraction of the area not covered by PTFE. Since a diazonium salt does not react with PTFE, the fraction of the carbon surface not covered by PTFE was evaluated by diazotizing an acetylene black before and after treatment with PTFE with the diazonium salt of sulfanilic acid. The ratio of the amount of sulfur attached to the surface of the black before and after treating with PTFE gives a reliable measure of the fraction of the surface not covered by PTFE.

In the experimental work, 0.833 g of Teflon PTFE 30 dispersion was added to 4.5 g of AB 100 acetylene black (Chevron) in 400 ml of water. The slurry was sonified for 20 minutes with a probe type sonifier. Thereafter, its pH was reduced to 3.0 by addition of dilute HCl. The dispersion was then filtered and the filter cake was washed with a large volume of water to ensure it was free of chloride ions. The cake was dried at 100° C. and then sintered for one hour at 360° C. under nitrogen to yield a product, sample 7420-80D, containing 10 weight % PTFE. A similar treatment was run to form a product, sample 7420-80F, containing 30 weight % PTFE.

Part of each of the samples, containing 10 and 30 weight % PTFE, was treated with an equal weight of the diazonium salt of sulfanilic acid in water containing 30 weight % isopropanol at 70° C. Since the amounts of diazonium salt and sample employed were comparable, the amount of treating agent used substantially exceeded that required for full surface attachment. The products were isolated by filtration, washed with copious amounts of water and methanol to remove unattached material and dried. The surface areas and sulfur contents of the samples before and after the diazonium treatment were determined. The difference in sulfur levels before and after treatment gives the level of attached sulfur. The sulfur content of the diazotized PTFE-free acetylene black was not measured but experience indicates that a maximum of 4.5 μmoles/$m^2$ of —$C_6H_4SO_3Na$ can be attached to the surface of carbon. Based on this figure, the diazotized acetylene black will contain a maximum of 11100 ppm sulfur. The ratio of sulfur concentrations introduced by the dizaotization treatment in the PTFE treated black, on a per unit weight of acetylene black basis, to that in the PTFE-free black was determined. The value of this ratio provides a measure of the fraction of the carbon surface to which attachment was possible and, hence, to the fraction of the surface not covered by PTFE. The results obtained are summarized in Table 4.

The surface area data in the table show that the PTFE treatment results in a rapid diminution in surface area. The sulfur numbers demonstrate that the PTFE covers a substantial portion of the carbon surface, being 68 and 85% at the 10 and 30% PTFE treatment levels, respectively. Thus, although PTFE provides hydrophobicity, these numbers show that it does block access to the catalyst surface.

TABLE 4

Effect of Sintered PTFE

| PTFE Weight % | Diazonium Salt Treated | BET Area M²/g | t-Area m²/g | Sulfur ppm | *Surface Fraction |
|---|---|---|---|---|---|
| 0 | No | 83.2 | 81.6 | 69 | 1 |
|   | Yes | **ND | ND | 11100 |   |
| 10 | No | 43.7 | 43.7 | 58 | 0.32 |
|   | Yes | 48.4 | 44.7 | 3855 |   |
| 30 | No | 30.2 | 30.6 | 41 | 0.15 |
|   | Yes | 33.9 | 31.2 | 1254 |   |

*Fraction of surface acetylene black, on a per unit weight basis (i.e., after acetylene black not covered by PTFE
**ND = Not Determined Hydrophobic Carbon Blacks Hydrophobic carbon blacks were made by the following procedures:

1) VXC 72 carbon black samples were treated with progressively increasing amounts of the diazonium salt of 3-trifluoromethyl aniline using the procedures in U.S. Pat. No. 5,851,280. The sample labels and the mmoles of attached triflourophenyl were:

Sample 7591-76-1, with 0.078 mmoles —$C_6H_4CF_3$ attached.

Sample 7591-76-2, with 0.17 mmoles —$C_6H_4CF_3$ attached.

Sample 7591-76-3, with 0.37 mmoles —$C_6H_4CF_3$ attached.

Sample 7591-76-4, with 0.52 mmoles —$C_6H_4CF_3$ attached.

2) Solutions containing 0.864 kg of the Zonyl FSD cationic surfactant solution (30 weight % surfactant) in 4.32 kg of water was prepared. The resulting solution contained 0.432 moles of surfactant. It was added over 10 minutes to 20 kg of a diafiltered, stirred, 10 weight % aqueous dispersion of BP 700 carbon black having 0.5 mmoles/g product of attached —$C_6H_4SO_3Na$ groups. Stirring was continued for an additional 60 minutes after which the flocculated product was isolated by filtration and then washed until it was chloride-free and finally dried at about 100° C. The product was labeled PFX 5520. The molar ratio of Zonyl FSD to attached —$C_6H_4SO_3Na$ groups in the PFX 5520 product was 0.43:1.

Zonyl FSD, 10 g, was diluted with 50 g of water. The resulting solution contained 5.0 mmoles of surfactant. A 10 g sample of diafiltered VXC 72 with 0.68 mmoles/g of attached —$C_6H_4SO_3H$ groups was dispersed in 100 cc of an aqueous medium containing 40 weight % isopropanol. The surfactant solution was added over 10 minutes to the stirred dispersion. Stirring was continued for an additional 60 minutes after which the resultant product was isolated by filtration, washed until it was free of chloride ions and dried at 100° C.

3) Poly(hexafluoropropylene oxide-co-difluoromethylene oxide)alcohol was reacted with p-nitrophenyl isocyanate in dry tetrahydrofuran. The crude product was hydrogenated in ethanol in the presence of a catalyst (5% palladium on activated carbon). Separation of the catalyst was accomplished by filtration to produce a perfluoroether-aniline having a nominal molecular weight of about 850 and with the structure:

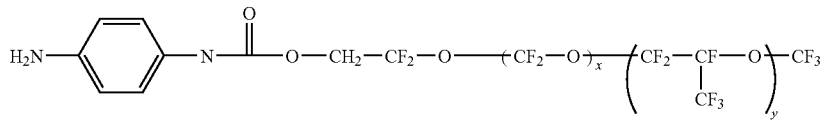

The aniline, 6 g, was dissolved in 18 g of ethanol for its subsequent use for attachment by the diazotization reaction. A pasty slurry consisting of 10 g of BP 700 carbon black in 24 g of ethanol was formed. To the stirred slurry maintained at 50° C. the following reagents were sequentially added: 13 g of 70 weight % $HNO_3$ diluted with 32.4 g water, the aniline solution and 5 g $NaNO_2$ dissolved in 20 g of water. The $NaNO_2$ solution was added over a 30 minute time period. The reaction mix was stirred for an additional 30 minutes after which the product (PFX 5830) was filtered off, washed with ethanol and finally dried.

3) An alcohol terminated polydimethyl siloxane (PDMS) with the structure

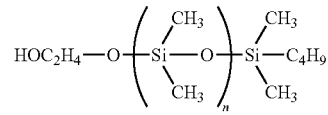

and having a molecular weight of about 1000 (Gelest, Inc.) was reacted with p-nitrophenyl isocyanate in dry tetrahydrofuran. The resulting product was hydrogenated in ethanol using a 5% palladium on activated carbon catalyst. The catalyst was removed by filtration to yield a solution of a PDMS containing aniline. The aniline, 7.2 g dissolved in 18 g of ethanol was added to 10 g of BP 700 carbon black slurried in 24 g of ethanol. Diazotization was accomplished using the same procedure as that of the previous example, yielding the hydrophobic product PFX 5840.

Knowledge of the extent of hydrophobicity generated by the various treatments was obtained by determining the volume fraction of methanol in a methanol/water solution required to just wet the sample. This was evaluated by shaking a 0.1 g sample of the various materials in aqueous media containing progressively larger volume percentages of methanol.

Catalyst Preparation

A series of supported 20% Pt catalysts were prepared using the procedure of Comparative Example A of Hards et al. (European Patent Application 0 512 713 A1). The supports employed, the groups (if any) attached to their surfaces prior to deposition of Pt and their levels are shown in Table 5. The support, 0.8 g, together with 125 ml of water was placed in a 500 ml three necked flask fitted with a condenser and a stirrer. The contents of the flask were heated to and maintained at 60° C. Sodium bicarbonate, 0.470 g in 3 ml of water was added to the slurry which was stirred for 5 minutes and then heated to and maintained at 100° C. for 30 minutes. An 8% chloroplatinic acid solution, 5.26 ml (containing about 0.20 g platinum), was added over about 12 minutes to the slurry which was then boiled and stirred under reflux for two hours. The slurry was cooled to 90° C. and 5.56 ml of a 1% formaldeyde solution was added. The slurry was stirred and boiled for an additional hour. Three procedures were then used to isolate the products. The untreated, conventional carbon blacks were isolated by filtration followed by washing until the filtrates were chloride-free. The cakes were dried at 105° C. Sample 6386-xxx (based on the use of CSX 619 with 0.4 mmoles of —$C_6H_4SO_3Na$ groups) was washed by filtration with 1 M sulfuric acid (to ensure that any —$C_6H_4SO_3Na$ present is converted to —$C_6H_4SO_3H$) and then with water until the filtrate was sulfate and chloride-free. The cake was dried at 105° C. The remaining samples formed relatively stable dispersions. In these cases, contaminants were removed by contacting the dispersions with a large excess of a mixture of cation and anion exchange resins which were in their $H^+$ and $OH^-$ forms. The resins were separated from the dispersions by screening. Thereafter the dispersions were dried overnight at 60° C. to give the solid catalysts.

TABLE 5

Catalyst Substrates

| Label | Black Grade | Group Attached | Level, mmoles/g (initial) |
|---|---|---|---|
| 6386- | VXC 72 | None | 0 |
| | | —$C_6H_4SO_3H$ | 0.13 |
| | | —$C_6H_4SO_3H$ | 0.24 |
| | | —$C_6H_4SO_3H$ | 0.31 |
| | | —$C_6H_4SO_3H$ | 0.68 |
| | CSX 619 | None | 0 |
| | | —$C_6H_4SO_3Na$ | 0.4 |
| 6386- | BP2000 | None | 0 |
| | | —$C_6H_4SO_3H$ | 1.33 |

Catalyst Preparation By Ion Exchange

To 0.5 g samples of BP 2000 carbon black with 1.33 mmoles/g of attached —$C_6H_4SO_3H$ groups varying aliquots of a 0.0774 molar [Pt(NH$_3$)$_4$]Cl$_2$ solution (15.1 mg Pt/ml) were added. The resulting dispersions were shaken for two hours at ambient temperatures, filtered and the Pt concentration in the filtrate determined by ICP (Inductively Coupled Plasma Spectroscopy). The volumes of solution employed and the fraction of the [Pt(NH$_3$)$_4$]$^{2+}$ complex removed from solution are summarized in Table 6.

TABLE 6

Ion Exchange With Cationic Pt(II) Complex

| Sample No. | Aliquot Volume Ml | Filtrate Pt Concentration mg/ml | Fraction Pt Exchanged |
|---|---|---|---|
| 6386-43-2 | 8 | 5.7 | 0.62 |
| 6386-43-3 | 12 | 8.3 | 0.45 |
| 6386-43-4 | 15 | 9.8 | 0.35 |

The results in the table show that substantial fractions of Pt are removed from solution by ion exchange, presumably in the form of [Pt(NH$_3$)$_4$]$^{2+}$ counterions to the attached —$C_6H_4SO_3^-$ groups. Reduction of the [Pt(NH$_3$)$_4$]$^{2+}$ counterions by a reducing agent, such as with a solution of NaBH$_4$, yields a finely divided Pt. After reduction, the attached —$C_6H_4SO_3^-$ groups can have $H^+$ counterions. This can be accomplished either by washing the product with acid followed by water or by passage of the dispersion through a bed containing a cation exchange resins in its $H^+$ form.

Example 2

BLACK PEARLS 2000 carbon black, 50 g, was diazotized with sulfanilic acid (about 25 g), resulting in the attachment of a high level of —$C_6H_4SO_3Na$ groups. The resulting dispersion was diafiltered to remove the reaction byproducts and then passed through a cation exchange column, in its hydrogen form, to replace the Na$^+$ in the attached group with $H^+$ (i.e., forming —$C_6H_4SO_3H$ groups). A solid product was obtained after drying the dispersion at 75° C. To an aqueous dispersion of the treated black (2 to 5 g), a solution of either [Pt(NH$_3$)$_4$](OH)$_2$ or [Pt(NH$_3$)$_4$]Cl$_2$ was added to achieve Pt loadings of either about 1 mmoles/g treated black or 0.65 mmoles/g treated black, respectively. The resulting products were dried at 75° C. Samples were then placed in a tube furnace, heated to a specified temperature (105, 120, and 140° C.) under N$_2$ and then reduced in a stream of a mixture of H$_2$ and N$_2$ at differing H$_2$:N$_2$ molar ratios. The reduced products, using [Pt(NH$_3$)$_4$](OH)$_2$ as the Pt source, were found to be contaminated with some NH$_3$, probably present as —$C_6H_4SO_3NH_4$. The NH$_4^+$ ion was replaced by $H^+$ by passage of the reduced products through a cation exchange column. With [Pt(NH$_3$)$_4$]Cl$_2$ as the Pt source, it is likely that the reduced product would be contaminated with both NH$_4^+$ and Cl$^-$. Such contaminants, if present, were removed by contacting a dispersion of the reduced product with a mixed bed of ion exchange resins in their $H^+$ and $OH^-$ forms. The solid products were recovered by drying the dispersions at 75° C.

Pt particle size and the uniformity of Pt dispersion in the resulting products were assessed qualitatively by transmission electron microscopy (TEM). In a few cases Pt particle size was determined by x-ray diffraction.

Pt accessibility was evaluated by CO oxidation in an electrochemical half-cell using cyclic voltammetry at 20 mV/s. For these purposes, an aqueous dispersion of the Pt supported product on the treated black was mixed with varying amounts of polyvinylidene fluoride (PVDF) dissolved in methyl vinyl pyrrolidone. The resulting dispersions were sprayed onto weighed hydrophobic Toray paper, dried and reweighed to determine the weight of Pt deposited per unit area. The Pt surface area was then evaluated by CO oxidation in 1 M H$_2$SO$_4$ (where proton conductivity is assured). In addition, the catalyst/Toray paper combination was bonded to a Nafion 115 membrane by hot pressing at 140° C. at 5000 psi for 90 seconds. The catalyst layer was sandwiched between the Toray paper and the membrane. Thereafter, its Pt surface area was determined by CO oxidation with humidified argon. In this case proton conductivity is provided only by the —$C_6H_4SO_3H$ groups attached to the carbon support. Thus a comparison of the Pt surface areas evaluated in $H_2SO_4$ and humidified argon provides a measure of the effectiveness of the treatment in providing the necessary proton conductivity in a PEM fuel cell.

Figure 5:
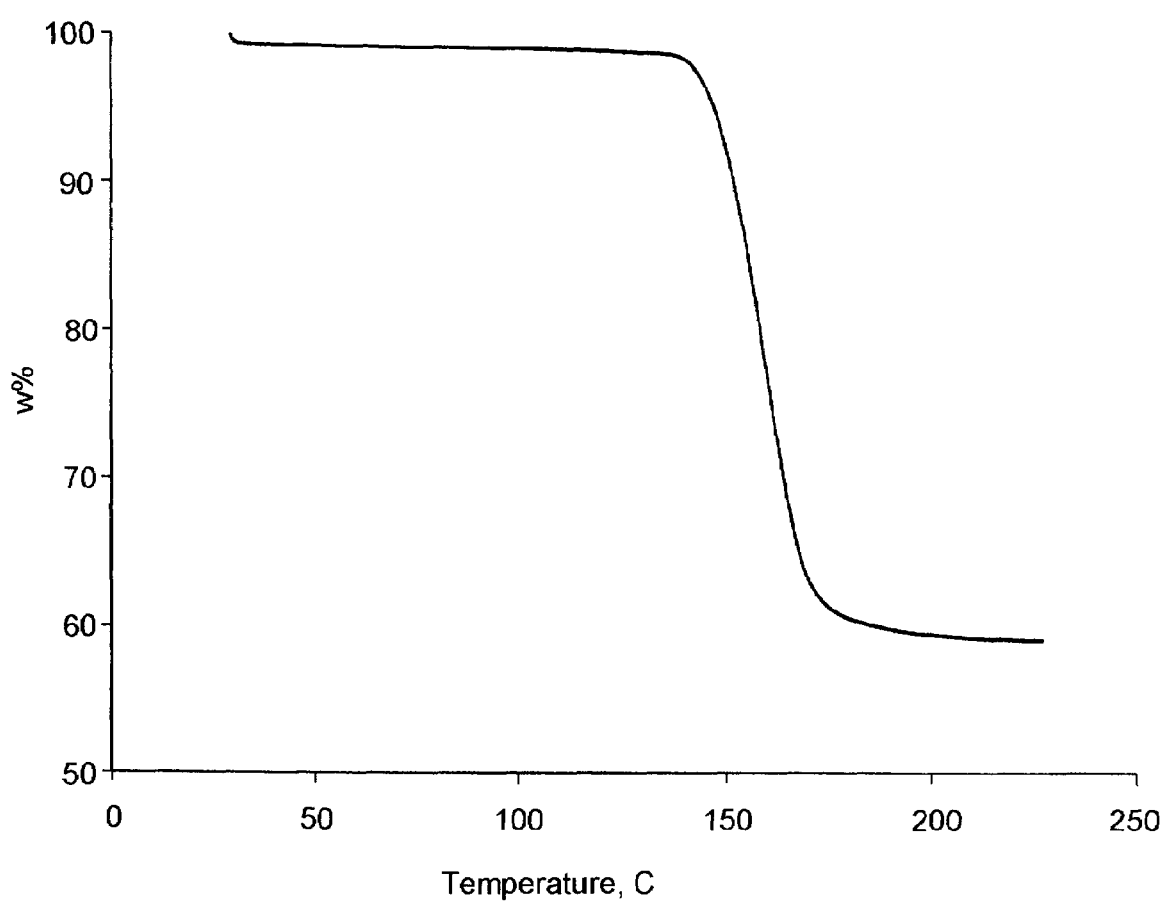
FIG. 5 is a graph showing the thermogravimetric analyses of $[Pt(NH_3)_4](OH)_2$.

Thermogravimetric analysis (TGA) of the pure $[Pt(NH_3)_4](OH)_2$ compound at a heating rate of 2° C./min under a stream of $H_2$ and $N_2$ at a molar ratio of 2:98 is depicted in FIG. 5. The onset for reduction occurs at about 140° C. and is complete at about 180° C. The observed weight loss (about 36%) indicates that the product is converted to Pt at this temperature range. Presumably, as the $H_2$:$N_2$ molar ratio in the gas is increased, the temperature required for reduction is reduced.

Initial experiments were performed using a BP 2000 carbon black with about 1.6 mmoles/g of attached —$C_6H_4SO_3H$ groups. To the dispersion of this black 0.65 mmoles of $[Pt(NH_3)_4]Cl_2$ was added and the dried material was then reduced at temperatures in the range of 105 to 140° C. in atmospheres of varying $H_2$:$N_2$ molar ratios. Some typical results obtained are summarized in Table 7. In general, the resulting Pt particles were somewhat coarse and poorly dispersed on the surface of the carbon black. These results suggest that incomplete exchange results in poor Pt distribution. Also the presence of the chloride ion may accelerate growth of the Pt particles.

TABLE 7

Results with $[Pt(NH_3)_4]Cl_2$

| Sample Number | Temperature ° C. | $H_2$:$N_2$ Mole Ratio | Time hours | Pt Size, nm (From TEM's) | [1]XRD Pt Size nm |
|---|---|---|---|---|---|
| 6529-48-1 | 140 | 5:95 | 4 | ~7 | 10.3 |
| 6529-87-2 | 120 | 100:0 | 1 | ~8 | ND |
| 6573-17-1 | 105 | 100:0 | 1 | Agglomerated | 9.6 |
| 6573-75-1 | 140 | 5:95 | 4 | ~6 | ND |

[1]X-ray diffraction, ND = not determined

Figure 6:
FIGS. 6 and 7 are TEM microphotographs of modified carbon product with Pt distributed throughout.
Figure 7:

Use of $[Pt(NH_3)_4](OH)_2$ in the ion exchange process with a BP 2000 product containing 2 mmoles/g of attached —$C_6H_4SO_3H$ groups was investigated next. The effects of reduction conditions on Pt particle size are summarized in Table 8. The results indicate that Pt particle size is dependent on the $H_2$:$N_2$ molar ratio, increasing progressively from about 1 nm at a 5:95 molar ratio up to about 6 to 8 nm in a pure $H_2$ atmosphere. Moreover, the Pt distributions appeared to be reasonably uniform. Some typical TEM's are shown in FIGS. 6 and 7.

TABLE 8

Results with $[Pt(NH_3)_4](OH)_2$

| Sample Number | Temperature ° C. | $H_2$:$N_2$ Mole Ratio | Time hours | Pt Size, nm (From TEM's) | [1]XRD Pt Size nm |
|---|---|---|---|---|---|
| 6573-42-2 | 120 | 100:0 | 1 | ~6 | ND |
| 6573-48-1 | 140 | 5:95 | 4 | ~1 | <1 |

TABLE 8-continued

Results with $[Pt(NH_3)_4](OH)_2$

| Sample Number | Temperature ° C. | $H_2$:$N_2$ Mole Ratio | Time hours | Pt Size, nm (From TEM's) | [1]XRD Pt Size nm |
|---|---|---|---|---|---|
| 6573-52-1 | 120 | 5:95 | 4 | ND | <1 |
| 6573-86-1 | 140 | 50:50 | 4 | ~4 | ND |
| 6573-92-1 | 140 | 10:90 | 4 | ~1 | ND |
| 6573-98-1 | 140 | 30:70 | 4 | ~2 | ND |
| 8848-4-1a | 140 | 5:95 | 5.5 | ~1 | ND |

The Pt loading (about 1 mmole/g of treated carbon black), achieved was about 15 weight %. This figure can be readily increased by repeating the ion exchange/reduction processes (after $NH_4^+$ removal) for a second time or even a third time so that very high Pt loadings can be achieved. The results in the table demonstrate that by control of the reduction conditions (temperature, time and, especially, atmosphere) supported catalysts with any desired Pt particle size in the range of about 1 to 6 nm can be prepared. Further, heat treatment of sample 6573-48-1 (Pt Particle size ~1 nm) in a $H_2$ atmosphere at a temperature of 140° C. resulted in ripening of the Pt particles to a mean size of about 4 nm. Thus, when high Pt loadings are desired, requiring more than one ion exchange and reduction cycle, it is preferred to effect all reductions in an atmospheres of low $H_2$ content, to form ~1 nm sized particles. A subsequent heat treatment in a hydrogen rich atmosphere will allow formation of particles of increased size.

Finally, it should be mentioned that in the present case the concentration of attached —$C_6H_4SO_3H$ groups is very large, representing 30 weight % of the treated carbon black weight. When considered on a treatment-free basis, the Pt loading after a single exchange and reduction cycle is about 28 weight %. Thus on a treatment-free basis, a second exchange/reduction could achieve Pt loadings in excess of 40 weight %.

Figure 8:
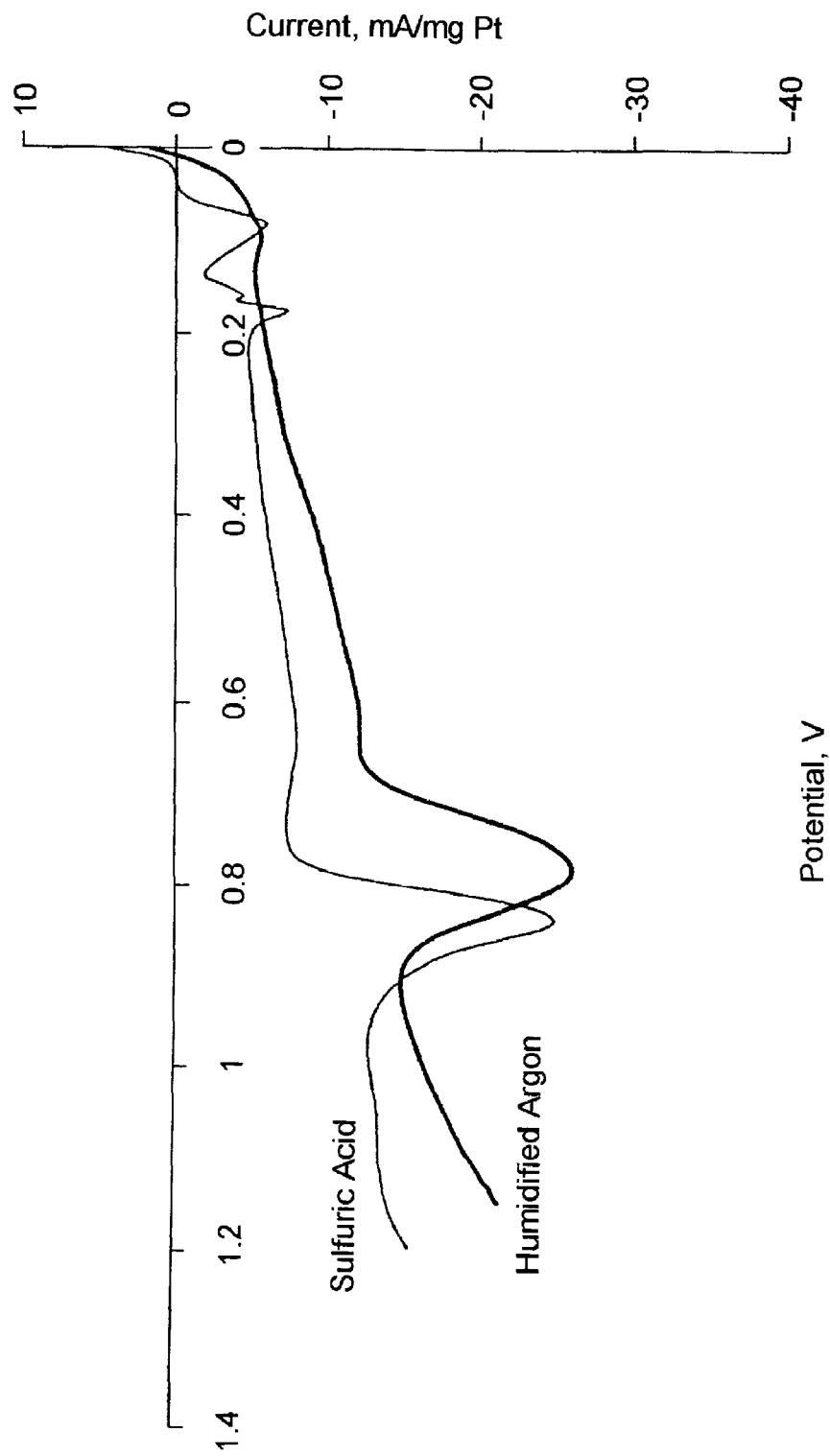
FIG. 8 is a graph showing accessible Pt surface area by cyclic voltammetry.

The accessible Pt surface area in sample 6573-42-2 (~6 nm particles) was determined by cyclic voltammetry. The results obtained are depicted in FIG. 8 and demonstrate that the extents of CO oxidation in $H_2SO_4$ and in humidified argon are comparable. This means that the proton conduction provided by the attached —$C_6H_4SO_3H$ groups provide more than adequate $H^+$ transport. However, the actual accessible Pt surface area, about 20 $m^2/g$ (calculated form the voltammograms) is less than half that calculated from the observed Pt particle size. This low accessible surface area is attributed to the use of a very large binder level (35 weight % PVDF). A large binder level was required to prevent peptization of the catalyst layer in aqueous media. The high propensity for peptization is attributed to the presence of the large concentration of attached —$C_6H_4SO_3H$ groups. Clearly, while the presence of a large concentration of attached —$C_6H_4SO_3H$ is advantageous in providing a large ion exchange capacity, allowing achievement of high Pt loadings, it is a does necessitate the use of large binder levels, hindering Pt accessibility.

It is proposed that the tradeoff between high ion exchange capacity and increased peptization propensity can be overcome by replacing a large fraction of the attached —$C_6H_4SO_3H$ groups with attached —$C_6H_4COOH$ groups. Thus the ion exchange capacity of the treated product should be unaffected but under acidic conditions (provided by the attached —C$_6$H$_4$SO$_3$H groups) the weakly acidic, attached —C$_6$H$_4$COOH groups should remain undissociated.

Example 3

CSX 619 carbon black, having a BET surface area of about 600 m$^2$/g, a t-area of about 400 m$^2$/g and a DBP of 100 cc/100 g, was diazotized with sulfanilic acid. The resulting product, after diafiltration, ion exchange and drying, contained 0.9 mmoles/g of attached —C$_6$H$_4$SO$_3$H groups. This treated carbon black was then dispersed in LLDPE in a 60 cc Brabender mixer to achieve a treated black loading of 40 weight %. Samples of the resulting product were than compressed at a pressure of 30,000 lb at a temperature of 150° C. to form membranes having a thickness of about 60 microns. A sample of the neat LLDPE was also compressed to form a membrane of comparable thickness (63 microns).

The treated black loaded LLDPE membrane was sandwiched between two hydrated Nafion 112 membranes and then bonded together by hot pressing at 140° C. at 5000 psi for about 2 minutes. The thickness of the membrane sandwich was measured to be 124 microns. A composite membrane, consisting of 4 layers of Nafion 112, was also formed by hot pressing under comparable conditions. The thickness of the composite membrane was 132 microns.

The device used to obtain an initial measure of the resistance of the three membranes to methanol permeation is shown in FIG. 9. The compartments holding about 10 cm$^3$ of water and methanol were isolated from each other by the membrane held tautly by o-rings clamped in a sanitary type fitting. The membrane area separating the two compartments was 4.25 cm$^2$. The device was placed in an oven maintained at a temperature of 70° C. for 24 hours after which the amount of methanol transported to the water compartment was estimated from a measure of its density.

The methanol content of the aqueous compartment in the device of FIG. 9 was determined for LLDPE, sandwich and composite membranes under identical conditions (24 hours, 70° C.). The thickness of the membranes and the methanol contents of the aqueous compartment are summarized in Table 9. The results show that methanol cross-over through the relatively thin, neat LLDPE membrane is relatively small. That for the composite Nafion membrane, having a two-fold larger thickness, is about 7 times larger than for the LLDPE membrane. Methanol cross-over through the sandwich membrane is about one third that through the composite membrane.

TABLE 9

Extent of Methanol Transport

| Membrane | Membrane Thickness μm | Weight % Methanol In Water Compartment |
|---|---|---|
| LLDPE | 63 | 5.9 |
| Sandwich (Nafion/CB-LLDPE/Nafion) | 124 | 13 |
| Composite (Nafion) | 132 | 45 |

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A modified carbon product comprising a carbon material having attached at least one organic group and catalyst group, wherein the modified carbon product is formed by attaching at least one organic group to the carbon material to form a modified carbon material and attaching, adsorbing, forming or depositing the catalyst group onto the modified carbon material, wherein said organic group comprises at least one aromatic group or alkyl group, wherein said catalyst group comprises a metal catalyst, and said metal catalyst is reduced to form a dispersed metal on the surface of said modified carbon material.

2. The modified carbon product of claim 1, wherein said catalyst group comprises platinum.

3. The modified carbon product of claim 1, wherein said carbon material is carbon black.

4. The modified carbon product of claim 1, wherein said organic group is attached to said carbon material via a diazonium salt reaction.

5. The modified carbon product of claim 1, wherein said organic group is an amine group.

6. The modified carbon product of claim 1, wherein said organic group is a fluorinated organic group.

7. The modified carbon product of claim 1, wherein said organic group and said catalyst group are associated.

8. The modified carbon product of claim 1, wherein said organic group is a coordinating group.

9. The modified carbon product of claim 1, wherein said alkyl group is directly attached to said carbon material.

10. The modified carbon product of claim 1, wherein said organic group comprises an aromatic group.

11. The modified carbon product of claim 10, wherein said aromatic group is directly attached to said carbon material.

12. The modified carbon product of claim 1, wherein said organic group is an ionic group.

13. The modified carbon product of claim 12, wherein said catalyst group is a counterionic catalyst group.

14. The modified carbon product of claim 13, wherein said counterionic catalyst group comprises Pt(2+).

15. The modified carbon product of claim 13, wherein said counterionic catalyst group comprises [Pt(NH$_3$)$_4$]$^{2+}$.

16. The modified carbon product of claim 13, wherein said counter ionic catalyst group comprises a cationic catalyst group.

17. The modified carbon product of claim 13, wherein said counter ionic catalyst group comprises Pt(NH$_3$)$_4$$^{2+}$.

18. A modified carbon product comprising a carbon material having attached at least one organic group and catalyst group, wherein the modified carbon product is formed by attaching at least one organic group to the carbon material to form a modified carbon material and attaching, adsorbing, forming or depositing the catalyst group onto the modified carbon material, wherein said owanic group comprises at least one aromatic group or alkyl group wherein said organic group is a sulfonilic acid group.

* * * * *